(12) United States Patent
Atcravi

(10) Patent No.: US 6,202,595 B1
(45) Date of Patent: Mar. 20, 2001

(54) ANIMAL WASTE DISPOSAL SYSTEM

(76) Inventor: Itty Atcravi, P.O. Box 721899, San Diego, CA (US) 92172-1899

( * ) Notice: Subject to any disclaimer, the term of this patent is extended or adjusted under 35 U.S.C. 154(b) by 0 days.

(21) Appl. No.: 09/247,135

(22) Filed: Feb. 9, 1999

(51) Int. Cl.7 .................................................. A01K 1/01
(52) U.S. Cl. .......................................... 119/165; 119/166
(58) Field of Search ...................... 119/165, 166, 119/167, 168, 169; 209/235, 236, 281, 352

(56) References Cited

U.S. PATENT DOCUMENTS

| | | | |
|---|---|---|---|
| 4,493,288 | * 1/1985 | Kolk | 119/164 |
| 4,574,735 | * 3/1986 | Hohenstein | 119/163 |
| 4,854,267 | * 8/1989 | Morrow | 119/161 |
| 4,934,317 | * 6/1990 | Pourshalchi | 119/165 |
| 5,048,465 | * 9/1991 | Carlisi | 119/166 |
| 5,107,797 | * 4/1992 | LaRoche | 119/166 |
| 5,178,099 | * 1/1993 | Lapps et al. | 119/166 |
| 5,226,388 | * 7/1993 | McDaniel | 119/166 |
| 5,259,340 | * 11/1993 | Arbogast | 119/166 |
| 5,477,812 | * 12/1995 | Waters | 119/163 |
| 5,509,379 | * 4/1996 | Hoeschen | 119/166 |
| 5,544,620 | * 8/1996 | Sarkissian | 119/166 |
| 5,592,900 | * 1/1997 | Kakuta | 119/164 |
| 5,622,140 | * 4/1997 | McLlnay-Moe | 119/166 |
| 5,749,318 | * 5/1998 | Barbot et al. | 119/166 |
| 5,823,137 | * 10/1998 | Rood et al. | 119/166 |
| 5,911,194 | * 6/1999 | Pierson, Jr. | 119/166 |
| 5,915,331 | * 6/1999 | Kimm | 119/14.08 |
| 5,931,119 | * 8/1999 | Nissim et al. | 119/163 |
| 6,039,003 | * 3/2000 | Cox | 119/166 |

OTHER PUBLICATIONS

Itty Atcravi, Safety Features For Automatic Litter Box, Disclosure Document No. 435604 filed Mar. 31, 1998.

Itty Atcravi, Another Litter–Box Design, Disclosure Document No. 436613 filed May 18, 1998.

Itty Atcravi, Catbox Inventions, Disclosure Document No. 443611 filed Aug. 25, 1998.

* cited by examiner

Primary Examiner—Charles T. Jordan
Assistant Examiner—Yvonne R. Abbott
(74) Attorney, Agent, or Firm—Knobbe Martens Olson & Bear LLP

(57) ABSTRACT

An animal waste disposal system including a housing with an area for holding a bed of particulate litter, a scoop with a plurality of perforations for separating animal's waste from the particulate litter, and a drive mechanism for moving the scoop to remove animal's waste from the bed of particulate litter. The waste-removing operation is carried out by collecting a mixture of animal's waste and particulate litter in the interior of the scoop and moving the scoop in a raised position over the area for holding the bed of particulate litter to allow the collected particulate litter to sift through the perforations in the scoop while retaining animal's waste for disposal into a waste container. The bed of particulate litter may be arbitrarily defined by a plurality of contiguous sections, each of which can be cleaned or processed separately and independently. Two types of retractable partitions are provided to make the waste-removing mechanism inaccessible to the animal during its automatic operation.

30 Claims, 22 Drawing Sheets

ANIMAL WASTE DISPOSAL SYSTEM

FIELD OF THE INVENTION

The present invention pertains generally to an animal waste disposal system and method for removing animal's waste from a bed of particulate litter. More specifically, the present invention employs a mechanism for scooping animal's waste from a bed of particulate litter. Two types of retractable partitions are provided to prevent an animal from touching the waste-removing mechanism during its automatic operation.

BACKGROUND OF THE INVENTION

A variety of litter boxes or waste disposal systems exists with a mechanism for removing animal's waste from a bed of particulate litter. These systems may be classified into several categories based on their construction and functions. For example, one type of system includes a stationary litter tray with a rake, basket or scoop which moves along a predetermined path inside the litter tray to collect animal's waste from the bed of particulate litter. Another type of system uses a rotary litter container with a sifting screen positioned inside the container for separating animal's waste from the particulate litter as the container is rotated about a horizontal axis. A third type of system uses a conveyer belt for removing a mixture of animal's waste and particulate litter from one end of the container while clean litter is added at the other end of the container.

An example of a litter box with an automatic rake-moving mechanism is described in the U.S. Pat. No. 4,574,735 entitled "Electronic Litter System" issued to Hohenstein. This system uses a rake which rotates about a vertical axis in the center of a circular litter container. An animal sensor in the form of a membrane switch is used for detecting the presence of an animal inside the container and a delay circuit is used for energizing an electric motor to rotate the rake at a predetermined time after the animal has left the container. A second sensor for sensing the amount of waste in the waste container is also provided.

One problem associated with Hohenstein's device is that the rake always remains inside the litter container in a position which can make it difficult for an animal to move around or walk over the bed of particulate litter. In 1987 the applicant solved this problem by using a rack-and-pinion mechanism for moving a rake into and out of the bed of particulate litter (U.S. patent application Ser. No. 080,472, abandoned). A prototype which was demonstrated to litter-box manufacturers in the U.S. in 1987 employs a rake which moves back and forth along two racks positioned on opposite sides of a rectangular litter tray. The racks are curved upwards at opposite ends to cause the rake to move downwards into the litter bed at one end of the litter tray and upwards out of the litter bed at the other end of the tray. The mechanism for moving the rake is also used for moving the lid of the waste compartment as the rake leaves or enters the waste compartment. A mechanism for opening and closing a waste bag inside the litter-box housing is also described in the applicant's abandoned application. This bag-closing mechanism may be used in combination with a mechanism for sealing a bag with the use of heat, adhesive, or any suitable type of fastener.

One serious problem associated with this type of waste-removing mechanism is that it can be dangerous to the animal if the system is made to operate in a fully automatic fashion with the use of animal sensors, especially since most types of sensors are known to malfunction or fail to work properly from time to time. Another problem associated with this type of waste-removing mechanism is its inability to remove very small pieces of waste from the particulate litter. If the spacings between the prongs of the rake are substantially smaller than ½ inch, the rake would tend to push the particulate litter along with animal's waste into the waste container even when the device is used with fine-grain clumpable litter. A similar problem arises when the system is used with medium-grain litter even if the spacings between the prongs of the rake are substantially larger than ½ inch.

Several similar waste disposal systems have since been introduced which use a rake or a scoop for collecting animal's waste from the bed of particulate litter. Examples of these systems are shown in U.S. Pat. No. 5,048,465 entitled "Self-Cleaning Kitty Litter Box" issued to Carlisi, U.S. Pat. No. 5,226,388 entitled "Automated Cat Litter Disposal System" issued to McDaniel, U.S. Pat. No. 5,267,530 entitled "Self-Cleaning Cat Litter Box" issued to Zamoyski, U.S. Pat. No. 5,477,812 entitled "Automated Self-Cleaning Litter Box for Cats" issued to Waters and U.S. Pat. No. 5,544,620 entitled "Self-Cleaning Cat Box" issued to Sarkissian. However, none of these systems provides a satisfactory solution to the problems mentioned above.

The second type of system uses a rotatable container with a sifting screen attached to the inside of the container for separating animal's waste from the particulate litter. Examples of these systems are found in U.S. Pat. No. 4,120,264 entitled "Sanitary Facility for Pets" issued to Carter and U.S. Pat. No. 5,662,066 entitled "Automatic Cat Litter Device and Method" issued to Reitz. This type of system do not work well with non-clumpable, non-absorbent litter since the liquid waste will tend to flow along the interior surface of the container as the latter is rotated. These systems can also produce a lot of dust when used with clumpable litter and cannot effectively remove pieces of waste or clumps which adhere to the inside surface of the container.

Another type of system employs a conveyer belt for supporting the bed of particulate litter and for removing a mixture of animal's waste and particulate litter from one end of the litter container while clean litter is added at the other end. Examples of these systems are described in U.S. Pat. No. 4,465,018 entitled "Pet Relief Station" issued to Mopper and U.S. Pat. No. 5,289,799 entitled "Automatic Pet Relief Station" issued to Wilson. Although these systems are believed to be safe for the animals, the mechanism for removing the waste from the litter can be complicated and difficult to clean.

SUMMARY OF THE PRESENT INVENTION

It is therefore an object of the present invention to provide an automatic waste removal system for animal with a safe waste-removing mechanism. Another object is to provide a waste-removing mechanism which is capable of removing substantially smaller pieces of waste from the bed of particulate litter. A further object of the present invention is to provide an automatic waste disposal system which is suitable for use with medium-grained non-absorbent litter as well as fine-grained clumpable litter.

These and other objects are achieved in accordance with the present invention by providing a stationary housing having an area for holding a bed of particulate litter. For illustrative purposes, the bed of particulate litter is arbitrarily defined by multiple contiguous sections. Each section may be separately and independently cleaned or processed by the waste-removing mechanism.

The present invention employs a scoop having a cup-shaped cross section with perforations for separating and removing animal's waste from the bed of particulate litter. The scoop is coupled to an electric motor which is securely positioned in the housing. In the preferred embodiment an electric motor provides the driving force for the lateral and pivotal movement of the scoop relative to the stationary housing. This movement selectively positions the scoop above any predetermined section of the litter bed for capturing animal's waste from that section. The scoop is pivoted into the litter bed and moved laterally by a small distance to collect a mixture of animal's waste and particulate litter. It is then pivoted out of the litter bed and moved laterally towards one end of the litter tray while the particulate litter inside the scoop is allowed to fall through the perforations into the litter tray. Further pivoting of the scoop causes animal's waste to fall into the waste container. The waste-removing process is then repeated to remove animal's waste from the remaining sections of the litter bed until all of the sections have been cleaned or processed.

The second embodiment of the present invention employs a different mechanism for pivoting the scoop. This mechanism includes a plurality of tracks or guide rails positioned adjacent to the litter tray to cause the scoop to rotate or pivot about its axis of rotation as the latter is moved laterally.

Two types of retractable partitions are provided for making the waste-removing mechanism inaccessible to the animal during its automatic operation. Consequently these retractable partitions can make it physically impossible for the animal to get injured by the waste-removing mechanism. For the purpose of illustration, these retractable partitions are shown in separated embodiments although either of them may be used in combination with the waste-removing mechanism shown in the first or the second embodiment.

Figure 1:
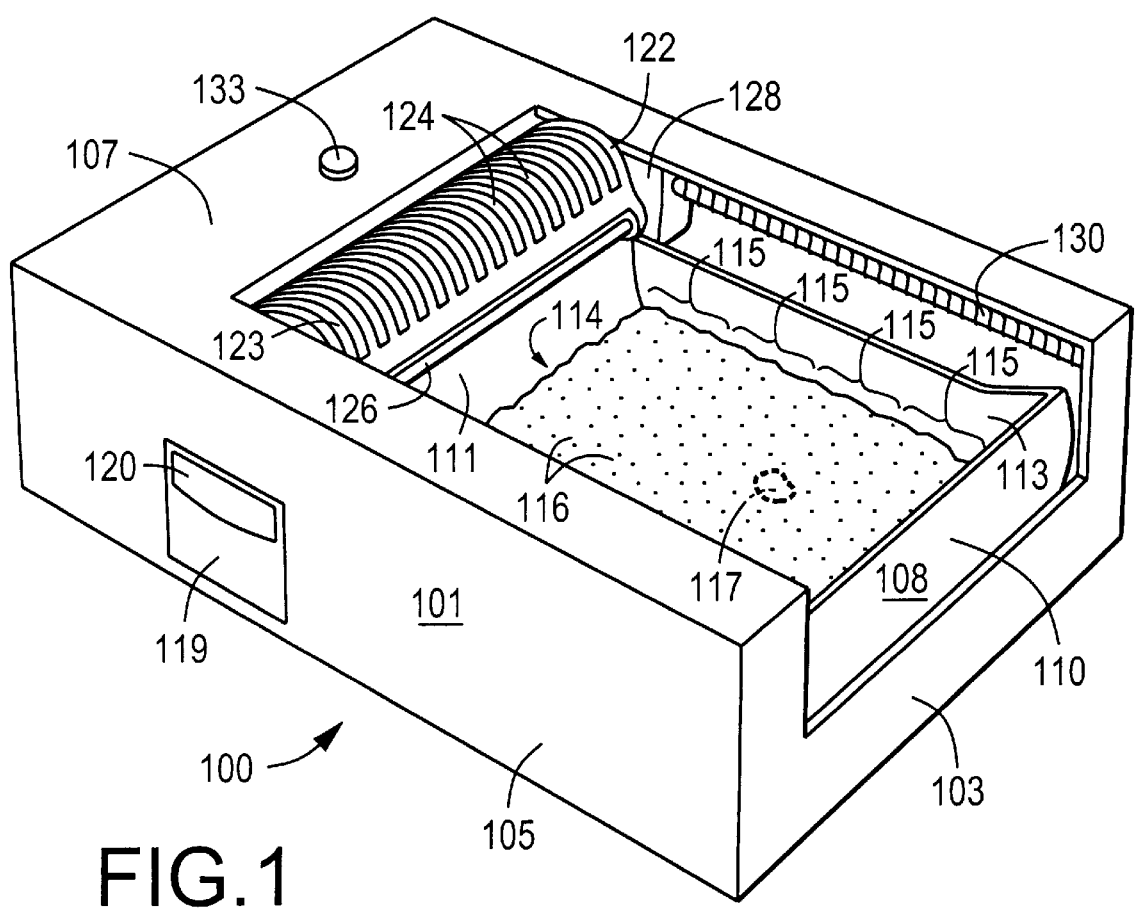
FIG. 1 is a perspective view of the preferred embodiment of the present invention with the scoop in its storage position covering the waste container.
Figure 2:
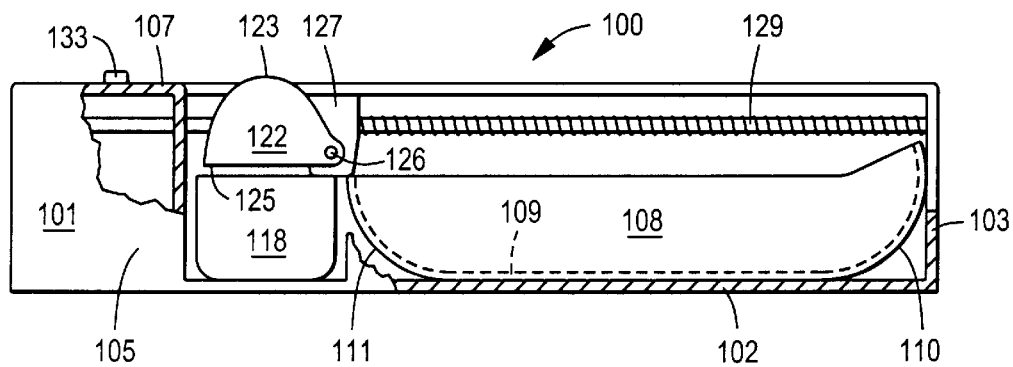
FIG. 2 is a side view of the preferred embodiment with the scoop in its storage position above the waste container and having a portion of the housing cut away to illustrate various components of the system.

REFERENCE NUMERALS IN DRAWINGS
Reference Numerals for the Preferred Embodiment 100 waste disposal system
101 housing
102 supporting base of housing 101
103 front wall of housing 101
104 rear wall of housing 101
105 side wall of housing 101
106 side wall of housing 101
107 top panel of housing 101
108 litter tray
109 bottom floor of litter tray 108
110 front curved end of litter tray 108
111 rear curved end of litter tray 108
112 side wall of litter tray 108
113 side wall of litter tray 108
114 litter bed
115 sections of litter bed 114
116 particulate litter 117 animal's waste
118 waste container
119 drawer
120 handle
121 handle
122 scoop
123 curved surface
124 perforations
125 leading edge
126 pivot rod
127 sleeve
128 sleeve
129 threaded rod
130 threaded rod
131 motor
132 controller
133 push button
134 plug
135 power cord
136 battery
137 motor shaft
138 first bevel gear
139 second bevel gear
140 alternating drive shaft
141 first sprocket wheel
142 second sprocket wheel
143 third sprocket wheel
144 fourth sprocket wheel
145 solenoid
146 pin
147 bracket
148 spring
149 short shaft
150 small gear
151 large gear
152 third bevel gear
153 fourth bevel gear
154 drive shaft
155 fifth bevel gear
156 sixth bevel gear
157 pivotal drive shaft
158 seventh bevel gear
159 eighth bevel gear
160 small gear
161 large gear
162 revolution counter
163 revolution counter Reference Numerals for the Second Embodiment 200 waste disposal system
201 housing
202 supporting base of housing 201
203 front wall of housing 201
204 outer side wall of housing 201
205 outer side wall of housing 201
206 outer rear wall of housing 201
207 inner side wall of housing 201
208 inner side wall of housing 201
209 inner rear wall of housing 201
210 top panel of housing 201
211 litter tray
212 bottom floor of litter tray 211
213 front curved end of litter tray 211
214 rear curved end of litter tray 211
215 side wall of litter tray 211
216 side wall of litter tray 211

217 litter bed
218 waste container
219 drawer
220 handle
221 handle
222 scoop
223 curved surface
224 perforations
225 scraper
226 pivot rod
227 motor
228 controller
229 push button
230 plug
231 power cord
232 motor shaft
233 bevel gear
234 bevel gear
235 horizontal shaft
236 bevel gear
237 bevel gear
238 bevel gear
239 threaded rod
240 bevel gear
241 threaded rod
242 revolution counter
243 opening in inner side wall 207
244 sleeve
245 finger on sleeve 244
246 finger on sleeve 244
247 circular knob on finger 245
248 wedge-shaped protrusion on finger 246
249 wedge-shaped protrusion on sleeve 244
250 opening in inner side wall 208
251 sleeve
252 finger on sleeve 251
253 finger on sleeve 251
254 circular knob on finger 252
255 wedge-shaped protrusion on finger 253
256 wedge-shape protrusion on sleeve 251
257 rectangular panel on inner side wall 207
258 flat protruding portion of panel 257
259 flat protruding portion of panel 257
260 flat protruding portion of panel 257
261 flat protruding portion of panel 257
262 flat protruding portion of panel 257
263 flat protruding portion of panel 257
264 flat protruding portion of panel 257
265 toothed edge on protruding portion 262
266 toothed edge on protruding portion 263
267 toothed edge on protruding portion 264
268 upper horizontal track section
269 middle horizontal track section
270 lower horizontal track section
271 upright track section
272 upright track section
273 upright track section
274 upright track section
275 upright track section
276 upright track section
277 wedge-shaped protrusion on panel 257
278 wedge-shaped protrusion on panel 257
279 wedge-shaped protrusion on panel 257
280 wedge-shaped protrusion on panel 257
281 wedge-shaped protrusion on panel 257
282 wedge-shaped protrusion on panel 257
283 wedge-shaped protrusion on panel 257

284 wedge-shaped protrusion on panel 257
285 wedge-shaped protrusion on panel 257
286 rectangular panel on inner side wall 208

Reference Numerals for the Third Embodiment 300 waste disposal system
301 housing
302 hood
303 top of hood 302
304 side wall of hood 302
305 side wall of hood 302
306 rear wall of hood 302
307 litter tray
308 bottom floor of litter tray 307
309 front curved end of litter tray 307
310 rear curved end of litter tray 307
311 side wall of litter tray 307
312 side wall of litter tray 307
313 waste container
314 scoop
315 scoop drive motor
316 controller
317 revolution counter
318 animal sensor
319 animal sensor
320 push button
321 audible alarm
322 retractable partition
323 adjustable panel
324 screw
325 slot on partition 322
326 partition drive motor
327 threaded rod
328 threaded-rod coupler
329 partition position sensor
330 push rod Reference Numerals for the Flow Diagram AUTOMATIC OPERATION
WAIT FOR PET TO ENTER
PET ENTERED ?
WAIT FOR PET TO EXIT
PET EXITED ?
START TIMER T SECONDS
PET BACK IN T SECONDS ?
CLOSE PARTITION
PARTITION OBSTRUCTED ?
OPEN PARTITION
OPERATE SCOOP
SCOOP OBSTRUCTED ?
OPEN PARTITION
ACTIVATE ALARM Reference Numerals for the Fourth Embodiment 500 waste disposal system
501 housing
502 litter tray
503 bottom floor of litter tray 502
504 front curved end of litter tray 502
505 rear curved end of litter tray 502
506 side wall of litter tray 502
507 side wall of litter tray 502
508 waste container
509 scoop 510 controller
511 transmitter
512 transmitter
513 receiver
514 receiver
515 push button
516 audible alarm
517 retractable cover
518 first movable section of cover 517
519 second movable section of cover 517
520 fixed rear section of cover 517
521 front panel of first movable section 518
522 rear portion of first movable section 518
523 front portion of second movable section 519
524 attachment on first movable section 518
525 attachment on first movable section 518
526 pin on first movable section 518
527 pin on first movable section 518
528 pin on first movable section 518
529 pin on first movable section 518
530 pin on second movable section 519
531 pin on second movable section 519
532 pin on second movable section 519
533 pin on second movable section 519
534 inner side wall of housing 501
535 slot on inner side wall 534
536 slot on inner side wall 534
537 inner side wall of housing 501
538 slot on inner side wall 537
539 slot on inner side wall 537
540 sloping front end of slot 536
541 sloping front end of slot 539
542 opening in inner side wall 534
543 opening in inner side wall 537
544 cover position sensor
545 push rod
546 cover drive motor
547 pulley
548 belt
549 pulley
550 pulley
551 string
552 pulley
553 clip Reference Numerals for the Fifth Embodiment 600 waste disposal system
601 housing
602 litter tray
603 perforations on litter tray 602
604 liquid-waste container
605 solid-waste container
606 scoop
607 Retractable cover Description of the Preferred Embodiment Referring to FIGS. 1, 2, 3 and 4, the animal waste disposal system 100 is shown to have a stationary housing 101 with a supporting base 102, a front wall 103, a rear wall 104, opposite side walls 105, 106 and a top panel 107. Housing 101 may be made of plastic, metal, fiberglass or any other suitable material known to those skilled in the art.

A litter tray 108 is positioned on supporting base 102 inside housing 101. Litter tray 108 has a bottom floor 109, a front curved end 110, a rear curved end 111 and two opposite side walls 112 and 113. Litter tray 108 may be permanently installed in housing 101 but is preferably removable for cleaning and for disposal of its contents. Litter tray 108 is preferably made of plastic but may be made of metal or any other suitable material.

FIG. 1 also shows a bed of particulate litter 114 inside litter tray 108. Litter bed 114 is divided into multiple contiguous sections 115 whose number, volume and dimensions may be arbitrarily assigned or based on the volume of particulate litter 116 which can be processed at any one time. A piece of animal's waste 117 is buried in litter bed 114 and can be seen in FIG. 1.

Housing 101 also contains a waste container 118 which is attached to a drawer 119. Two handles 120 and 121 are provided at opposite ends of drawer 119 so that drawer 119 may be easily removed from either side of housing 101.

A scoop 122 is shown in FIGS. 1, 2, 3 and 4 in its inverted standby or storage position above waste container 118. Scoop 122 is shown to have a curved surface 123, preferably with a cup-shaped cross section for holding a volume of particulate litter 116 mixed with animal's waste 117. Perforations 124 in scoop 122 may be holes, openings or slots of any suitable shape or dimension. Perforations 124 allow scoop 122 to function as a sieve or screen for separating animal's waste 117 from particulate litter 116. Scoop 122 also includes a flat leading edge 125 which may be made plastic but is preferably made of metal for durability. The body of scoop 122 may be made of plastic, metal or any other suitable material.

Having described the preferred embodiment of scoop 122, it will be apparent to those skilled in the art that other embodiments incorporating the same concepts may be used. For instance, scoop 122 may have a less concave cross section than described above or may resemble a grate or a rake with open tines.

Scoop 122 is attached to a pivot rod 126 which is pivotably supported at opposite ends by attachment sleeves 127 and 128. Sleeves 127 and 128 are movable along threaded rods 129 and 130 in the respective order. This type of attachment provides both mechanical strength and support to scoop 122, especially during pivoting of scoop 122 into litter bed 114. It is well known to those skilled in the art that other types of transport rails may be used. For instance, one of the threaded rods could be replaced by a guide rail which provides only support and alignment to scoop 122.

Figure 3:
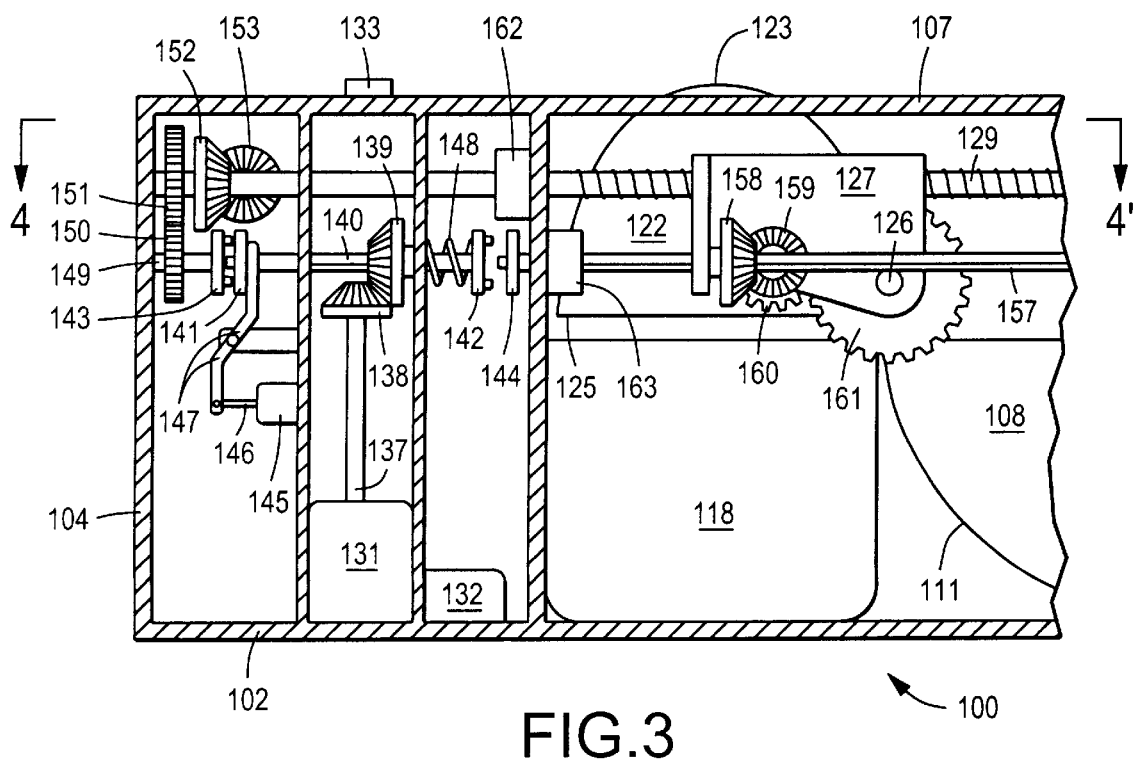
FIG. 3 is a sectional side view of the preferred embodiment taken along line 3–3' of FIG. 4, illustrating various components of the waste-removing mechanism.
Figure 4:
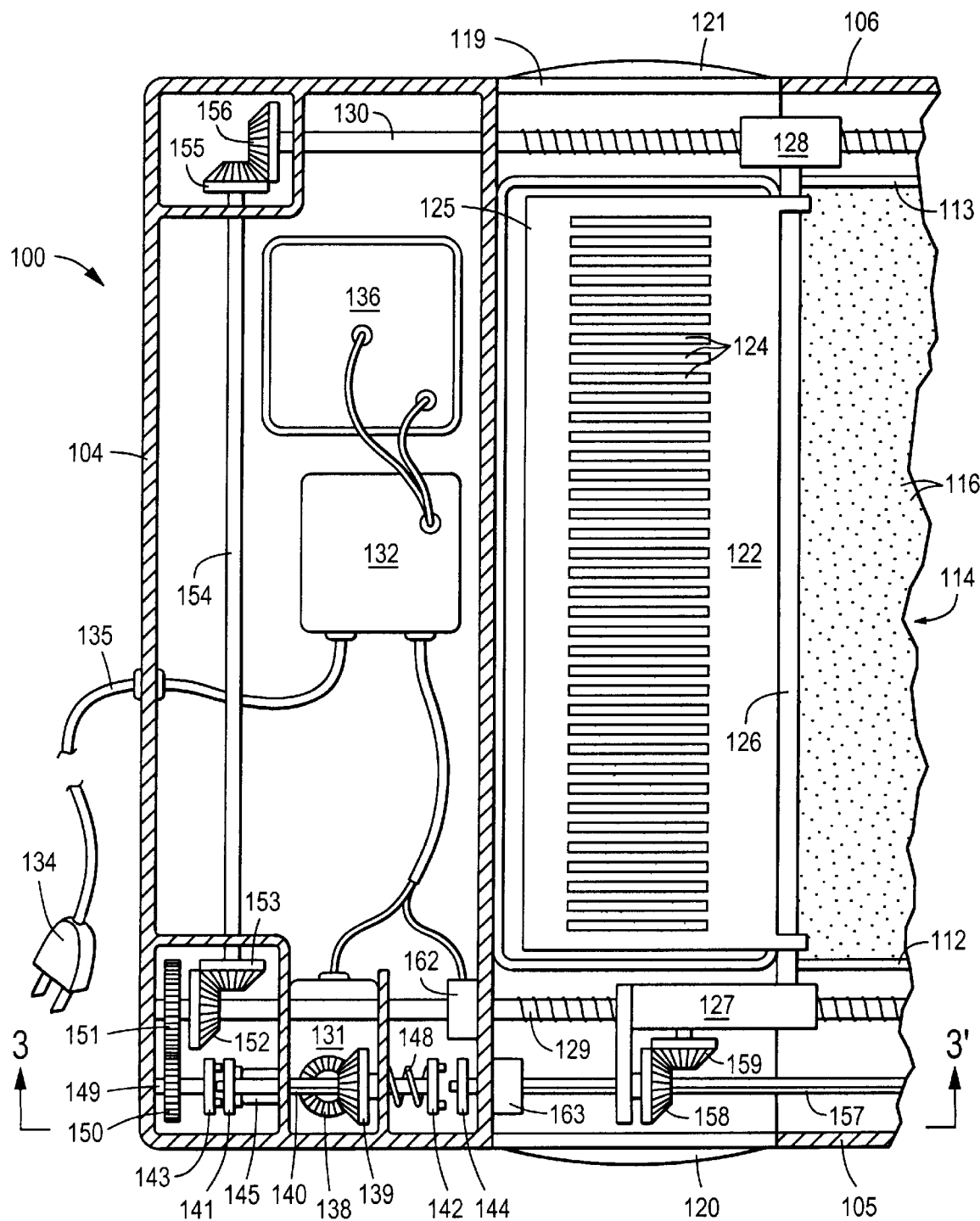
FIG. 4 is a top view of the preferred embodiment taken along line 4–4' of FIG. 3, illustrating the lateral and pivotal drive mechanisms.

Turning now to FIG. 3 and FIG. 4, the preferred embodiment of the present invention is shown to contain a reversible electric motor 131 and a controller 132 mounted on supporting base 102. Controller 132 may include a microprocessor and a plurality of switches or relays for controlling the various components of animal waste disposal system 100. A push button 133, which is used for initiating the waste-removing operation, is positioned on top of panel 107. A plug 134 (shown in FIG. 4) is provided for connecting animal waste disposal system 100 to a household power outlet. Electric current is conducted by means of a power cord 135 from plug 134 to controller 132. A backup battery 136 is also provided for maintaining power to controller 132 during power interruptions so that scoop 122 can be returned to its storage position.

Electric motor 131 includes a motor shaft 137 which is connected to first bevel gear 138. First bevel gear 138 is engaged with second bevel gear 139 which rotates an alternating drive shaft 140. First and second sprocket wheels 141 and 142 are attached to opposite ends of alternating drive shaft 140. Alternating drive shaft 140 is movable laterally in the direction along its axis of rotation. A movement of alternating drive shaft 140 towards rear end wall 104 of housing 101 engages first sprocket wheel 141 with third sprocket wheel 143 as shown in FIGS. 3 and 4. Alternatively, alternating drive shaft 140 may be moved laterally towards front end wall 103 of housing 101 to engage second sprocket wheel 142 with fourth sprocket wheel 144.

The lateral movements of alternating drive shaft 140 are accomplished by means of the activation and deactivation of solenoid 145 by controller 132. When solenoid 145 is activated, solenoid pin 146 is retracted into the body of solenoid 145 causing bracket 147 to push alternating drive shaft 140 towards rear end wall 104 of housing 101. The deactivation of solenoid 145 by controller 132 causes solenoid pin 146 to extend outward and allows spring 148 to move alternating drive shaft 140 towards the front end wall 103 of housing 101.

Alternating drive shaft 140 and the hole in second bevel gear 139 which accommodates alternating drive shaft 140 may have a square or hexagonal cross section to cause alternating drive shaft 140 to rotate with second bevel gear 139 while allowing alternating drive shaft 140 to move laterally with respect to second bevel gear 139.

Referring to FIG. 3 and FIG. 4, third sprocket wheel 143 is secured to one end of a short shaft 149 which is attached to a small gear 150. A large gear 151 is secured to threaded rod 129 and meshes with small gear 150. When solenoid 145 is activated and third sprocket wheel 143 is rotated by first sprocket wheel 141, the rotation is transmitted to threaded rod 129 which drives the lateral movement of sleeve 127.

A third bevel gear 152 is secured to threaded rod 129 and meshes with fourth bevel gear 153 which is mounted to one end of a drive shaft 154. Fifth bevel gear 155, which is mounted to the other end of drive shaft 154, meshes with sixth bevel gear 156. Sixth bevel gear 156 is secured to one end of threaded rod 130 which drives the lateral movement of sleeve 128. This arrangement causes the rotation of threaded rod 129 to be transmitted to threaded rod 130 so that an equal driving force is applied to both ends of pivot rod 126 as scoop 122 is moved laterally.

FIGS. 3 and 4 also illustrates that fourth sprocket wheel 144 is coupled to a pivotal drive shaft 157 which rotates seventh bevel gear 158. Seventh bevel gear 158 in turn rotates eighth bevel gear 159 which is connected to a small gear 160 (shown in FIG. 3). Small gear 160 meshes with a large gear 161 which is mounted to one end of pivot rod 126. When solenoid 145 is deactivated and fourth sprocket wheel 144 is rotated by second sprocket wheel 142, the rotation is transmitted to pivot rod 126 which drives the pivotal movement of scoop 122. Pivotal drive shaft 157 and the hole in seventh bevel gear 158 which accommodates pivotal drive shaft 157 may have a square or hexagonal cross section to cause seventh bevel gear 158 to rotate with pivotal drive shaft 157 while allowing seventh bevel gear 158 to move laterally with respect to pivotal drive shaft 157.

For the purpose of illustration, the drive mechanism comprising of the interconnected gear and shaft train which transmits motion from sprocket wheel 143 to threaded rods 129 and 130 to move sleeves 127 and 128, and scoop 122 in a lateral direction is defined as the lateral drive mechanism. The drive mechanism which transmits motion from sprocket wheel 144 to pivot rod 126 to pivot scoop 122 is defined as the pivotal drive mechanism. In an alternative embodiment (not shown), the lateral drive mechanism and the pivotal drive mechanism could be driven by multiple electric motors. It is also obvious to those skilled in the art that other embodiments incorporating different drive trains may be used. For instance, the drive train could be based on a pulley-and-chain mechanism or a rack-and-pinion mechanism.

Two revolution counters 162 and 163 are provided for counting the number of revolution made by threaded rod 129 and pivotal drive shaft 157 in the respective order. Revolution counters 162 and 163 send electrical signals to controller 132 so that the lateral and angular positions of scoop 122 can be determined by controller 132 at any time.

FIGS. 5A–5F are a sequence of illustrations that depict the lateral and pivotal movement of scoop 122 as it captures, separates, and removes animal's waste 117 from section 115 of litter bed 114 adjacent to the rear curved end 111 of litter tray 108.

Figure 5A:
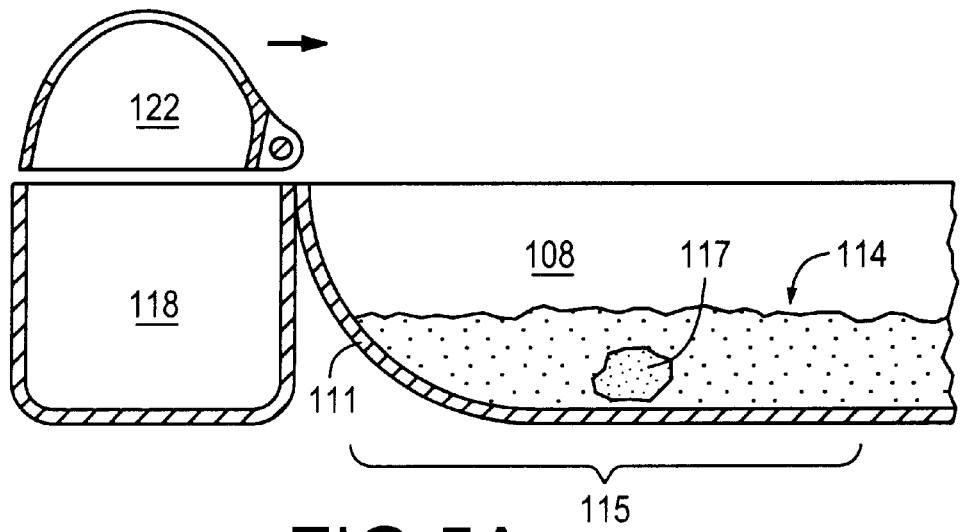
FIGS. 5A–5F are sectional side views of the preferred embodiment showing six different positions of the scoop during a waste-removing operation.

Initially referring to FIG. 5A, the scoop 122 is shown in its inverted storage position above waste container 118. The waste-removing operation begins with the user pressing push button 133 to engage the lateral drive mechanism. FIG. 5A also illustrates the direction of the lateral movement of scoop 122 towards litter tray 108.

Figure 5B:
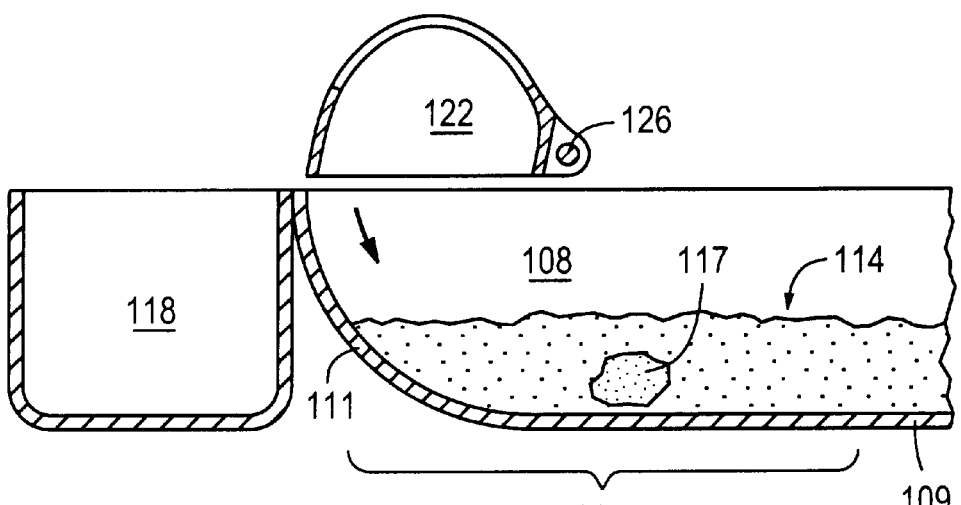

FIG. 5B illustrates the position of scoop 122 after it has come to a brief stop above section 115 of litter bed 114 adjacent to low curved end 111 of litter tray 108. At this instant, the lateral drive mechanism is disengaged and the pivotal drive mechanism is engaged to cause scoop 122 to pivot in the counterclockwise direction about pivot rod 126 into litter bed 114.

Figure 5C:
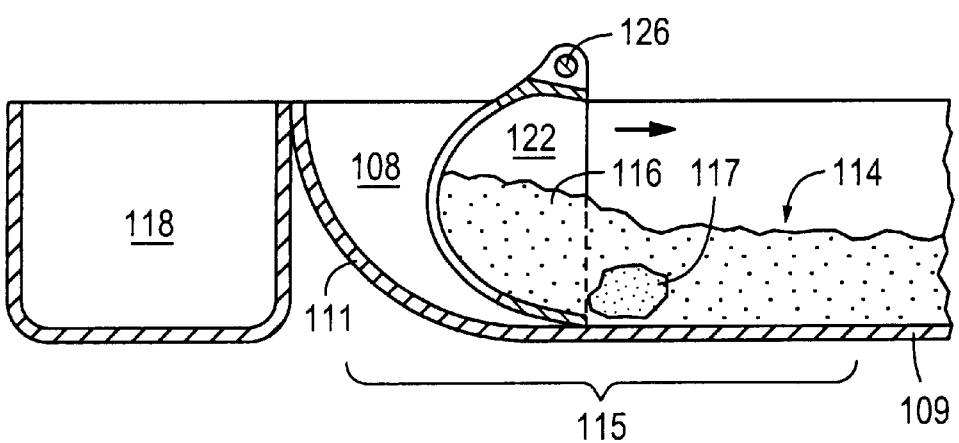

In FIG. 5C, scoop 122 has pivoted by approximately 90 degrees in the counterclockwise direction into litter bed 114. Some of the particulate litter 116 has accumulated inside scoop 122. Scoop 122 is positioned in such a way that it will come into contact with rear curved end 111 and bottom floor 109 of litter tray 108 during its pivotal motion to remove any pieces of waste which adhere to rear curved end 111 and bottom floor 109 of litter tray 108. After scoop 122 reaches the position shown in FIG. 5C, the pivotal drive mechanism is disengaged and the lateral drive mechanism is engaged to move scoop 122 further towards the front end of litter tray 108.

Figure 5D:
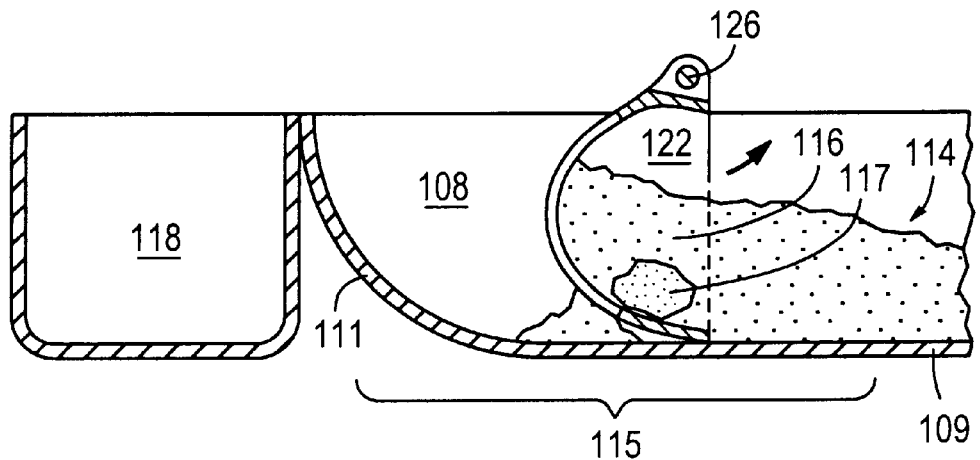

FIG. 5D illustrates the position of scoop 122 after it has moved through a predetermined distance towards the front end of litter tray 108. An additional amount of particulate litter 116 as well as animal's waste 117 have been collected into the interior of scoop 122. At this instant, the lateral drive mechanism is disengaged and the pivotal drive mechanism is re-engaged to pivot scoop 122 out of litter bed 114.

Figure 5E:
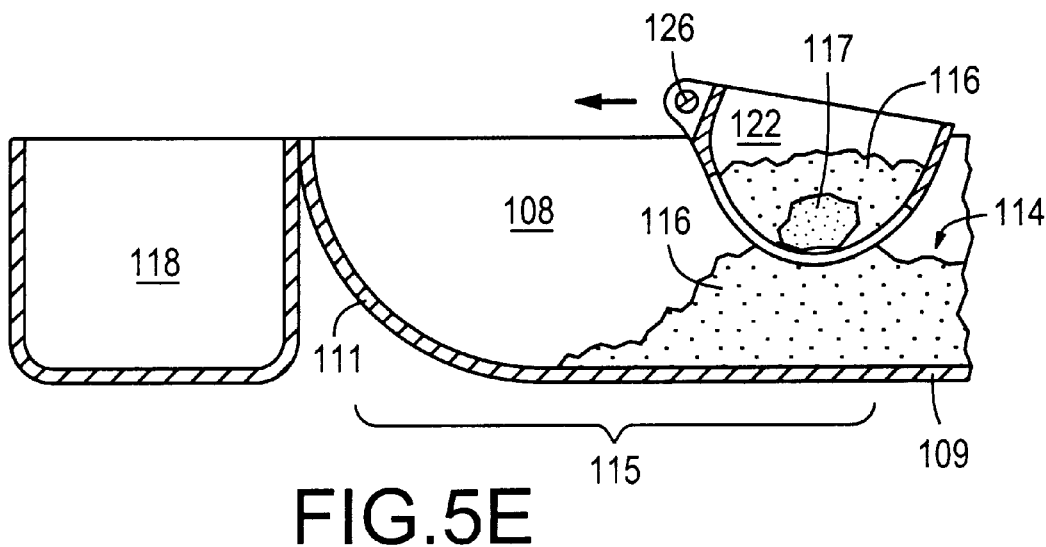

In FIG. 5E, scoop 122 has pivoted through an angle of approximately 80 degrees from the position shown in FIG. 5D. Some of the particulate litter 116 which has earlier been collected in the interior of scoop 122 has fallen through the perforations in scoop 122 and returned to litter bed 114. However, a large portion of particulate litter 116, as well as animal's waste 117, still remain in the interior of scoop 122. At this instant the pivotal drive mechanism is disengaged and the lateral drive mechanism is engaged once more to move scoop 122 back towards rear curved end 111 of litter tray 108.

As scoop 122 moves slowly towards rear curved end 111 of litter tray 108, the remaining portion of loose particulate litter 116 inside scoop 122 continues to fall through the perforations in scoop 122. The exterior surface of scoop 122 helps to level particulate litter 116 in litter tray 108 as scoop 122 moves laterally across litter bed 114.

Figure 5F:
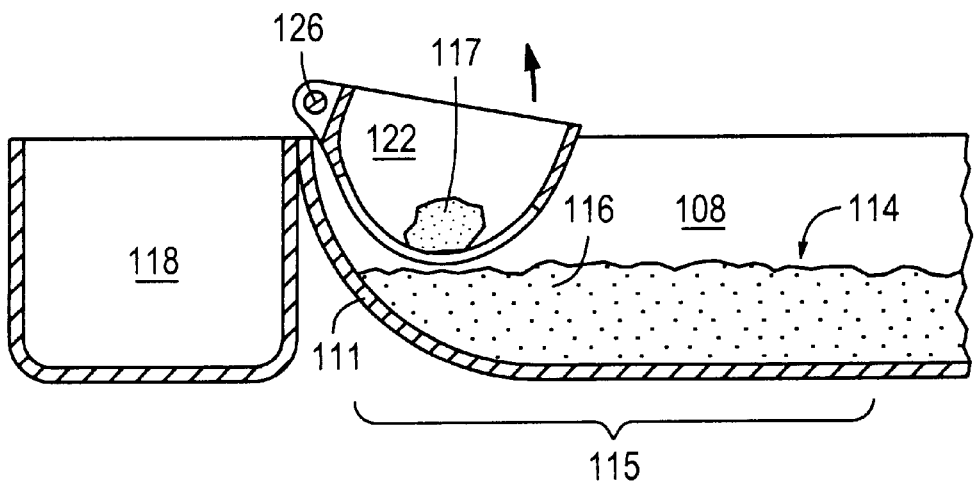

In FIG. 5F, scoop 104 has come to another brief stop after reaching rear curved end 111 of litter tray 108. The lateral drive mechanism is disengaged and the pivotal drive mechanism is engaged again to pivot scoop 122 into its storage position shown in FIG. 5A. This pivotal movement of scoop 104 causes animal's waste 117 to drop into waste container 118.

It is obvious to those skilled in the art that controller 132 may be programmed to repeat this waste-removing process to remove animal's waste from each of the remaining sections 115 of litter bed 114 (shown in FIG. 1) by varying the distance scoop 122 is moved laterally towards front curved end 110 of litter tray 108 before it is pivoted into litter bed 114. It can also be seen that the distance scoop 122 is moved laterally towards rear curved end 111 of litter tray 108 after it is pivoted out of litter bed 114 should be adjusted accordingly.

It is also obvious that by starting the waste-removing operation at section 115 of litter bed 114 closest to rear curved end 111 of litter tray 108 and proceeding serially towards front curved end 110, it is possible to avoid having to push the leading edge 125 of scoop 122 into a large piece of animal's waste in an area of litter bed 114 which has not been cleaned or processed earlier.

The total number of predetermined sections of litter bed 114 and the size of each section which may be separately cleaned or process can be permanently selected during the programming of controller 132. For example, the total number of predetermined sections may be selected from a range of values between 1 and 10 depending on the size of litter tray 108, the size of scoop 122 and the amount of particulate litter to be used. Alternatively, a more complex program may be provided to enable the user to change the total number of predetermined sections and the size of each section by means of a dial, a keypad, switches or jumpers.

Push button 133 may also be used for controlling the lateral drive mechanism to move scoop 122 by a small distance from the storage position towards front end 103 of housing 101 so that gear 161 will not obstruct in the removal of waste container 118. Controller 132 may be programmed to allow the user to perform this function by pressing push button 133 twice or by pressing and holding push button 133 for a predetermined period of time.

Figure 6:
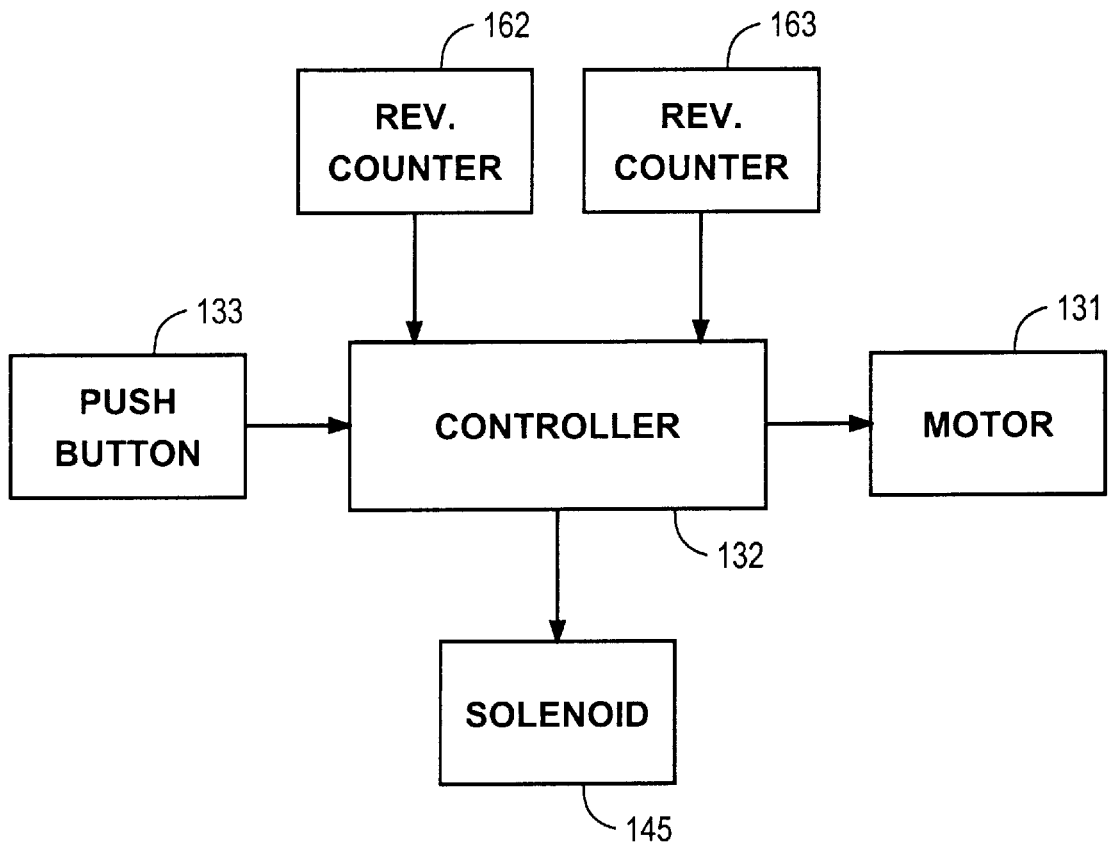
FIG. 6 is a block diagram showing a control system which can be used to implement the various features of the preferred embodiment.

FIG. 6 is a block diagram showing a control system which can be used to implement the various features of the preferred embodiment of the present invention. Controller 132 receives electrical signals from push button 133 as well as revolution counters 162 and 163. Motor 131 and solenoid 145 are connected to the outputs of controller 132. It is obvious to other electrical engineers or those skilled in the art that a single microprocessor can provide sufficient control capability for the operation of waste disposal system 100.

Description of the Second Embodiment

Another method of pivoting a scoop to remove animal's waste from different sections of a bed of particulate litter involves the use of tracks or guide rails positioned on opposite sides of the litter tray to engage with levers or fingers connected to the axis of rotation of the scoop as the latter is moved laterally. FIGS. 7, 8, 9 and 10 show the second embodiment of the present invention which employs this type of mechanism to remove animal's waste from three contiguous sections of the bed of particulate litter.

The animal waste disposal system 200 includes a housing 201 having a supporting base 202, a front wall 203, two outer side walls 204, 205, an outer rear wall 206, two inner side walls 207, 208, an inner rear wall 209 and a top panel 210.

Figure 7:
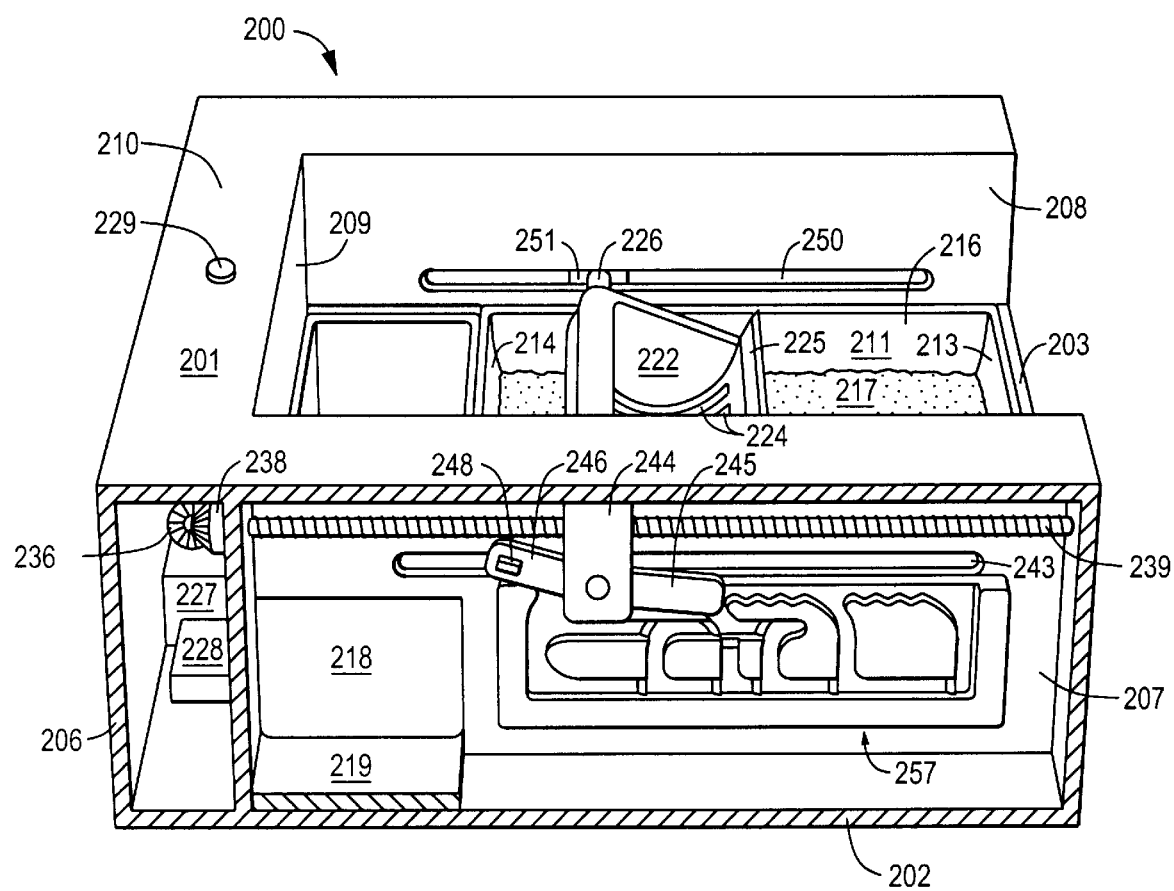
FIG. 7 is a perspective view of the second embodiment of the present invention showing the scoop in an intermediate position above the litter tray and having the proximate side wall removed to illustrate the drive mechanism for moving and rotating the scoop.
Figure 8:
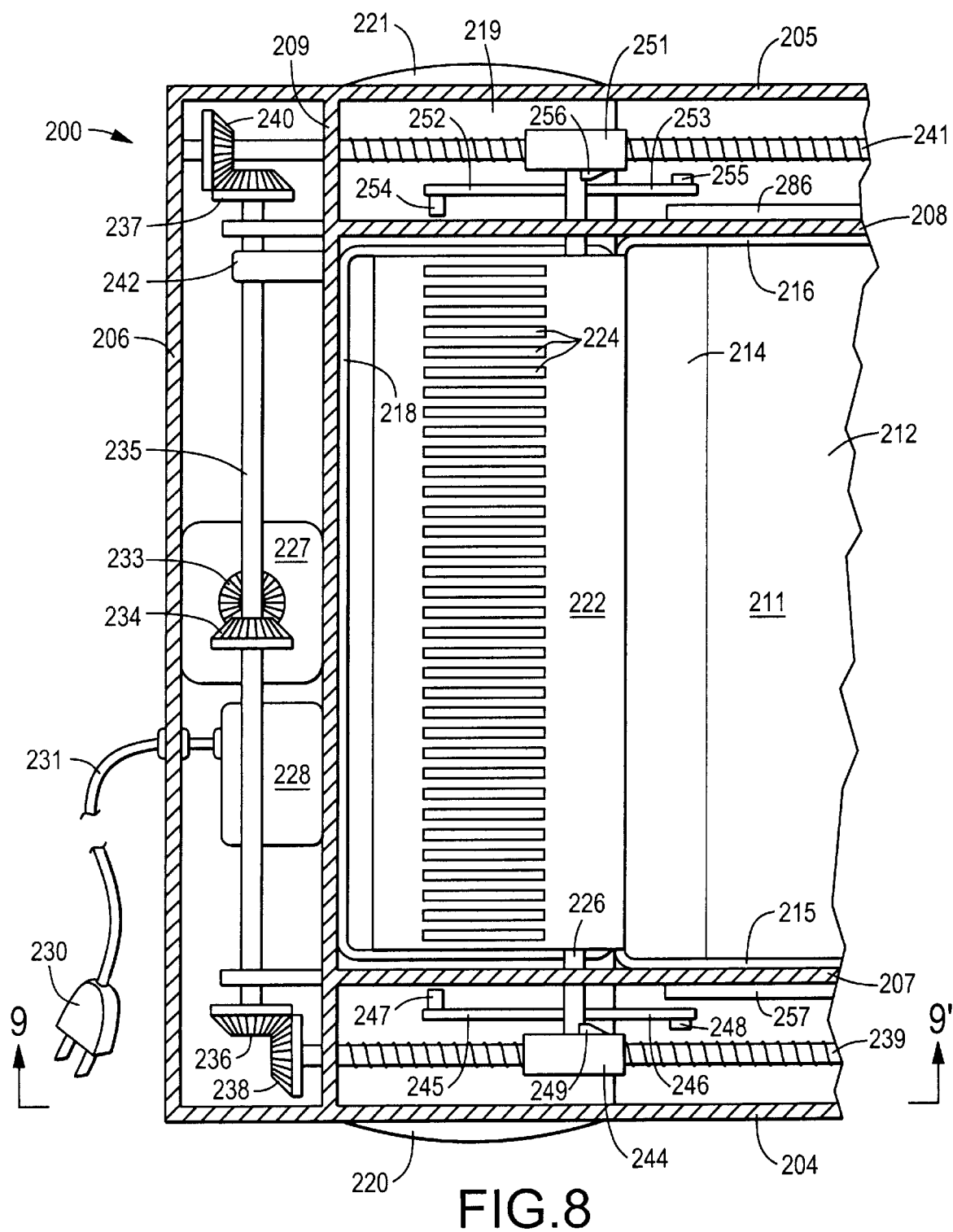
FIG. 8 is a top view of the rear section of the second embodiment taken along line 8–8' of FIG. 9 and showing the scoop in its storage position above the waste container.
Figure 9:
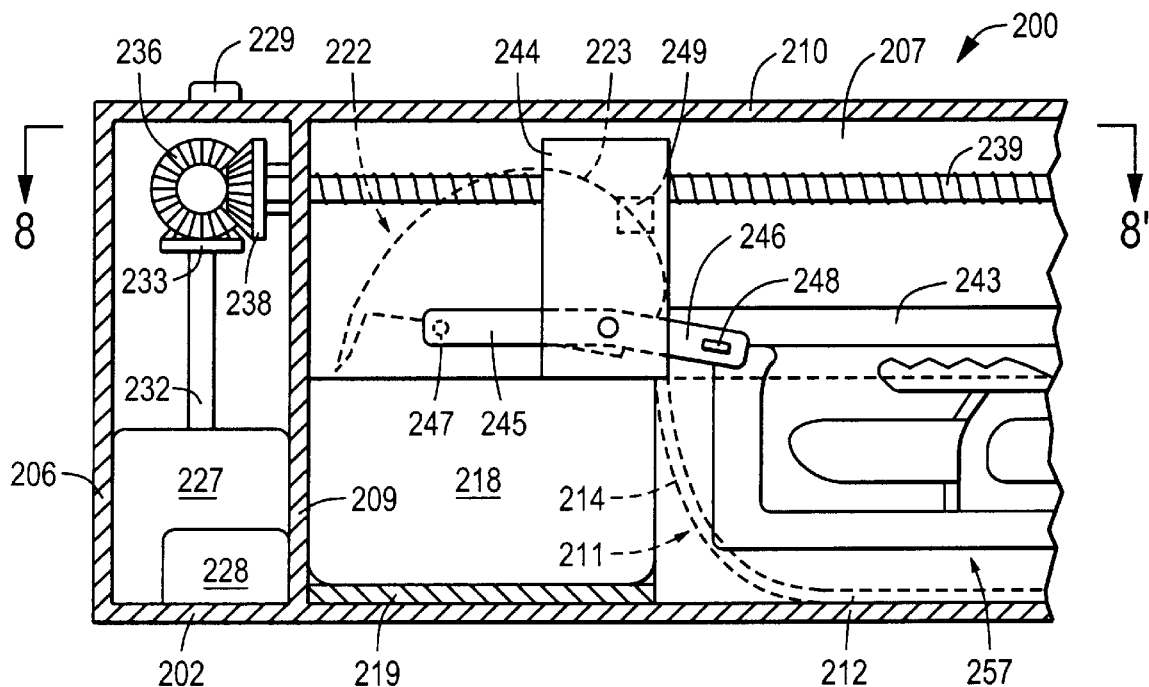
FIG. 9 is a sectional side view of the rear section of the second embodiment taken along line 9–9' of FIG. 8.

A removable litter tray 211 is positioned on supporting base 202 between inner side walls 207 and 208. It comprises a bottom floor 212, a front curved end 213, a rear curved end 214, and two opposite side walls 215, 216. FIG. 7 also shows a bed of particulate litter 217 inside litter tray 211. A waste container 218 is mounted on a drawer 219 which is positioned adjacent to litter tray 211. Handles 220, 221 are provided at opposite ends of drawer 219 so that the latter may be removed from either side of housing 201.

Scoop 222 includes a curved surface 223 which has a plurality of perforations 224. The leading edge of scoop 222 consists of a scraper 225 which is preferably made of metal and may be slightly flexible. Scoop 222 is connected to a pivot rod 226 and may be removable from the latter for cleaning.

A reversible electric motor 227 and a controller 228 are mounted to supporting base 202 of housing 201. A push button 229 is positioned on top of panel 210. A plug 230 (shown in FIG. 8) is provided for connecting waste disposal system 200 to a household power outlet. Electric current is conducted by means of a power cord 231 from plug 230 to controller 228. A backup battery (not shown) may also be provided.

Motor 227 includes a shaft 232 which is connected to a bevel gear 233. Bevel gear 233 meshes with another bevel gear 234 which is mounted to the center of a horizontal shaft 235. Horizontal shaft 235 is connected at opposite ends to bevel gears 236 and 237. Bevel gear 236 is engaged with bevel gear 238 which is mounted to a threaded rod 239. Bevel gear 237 is engaged with bevel gear 240 which is mounted to a second threaded rod 241. A revolution counter 242 is provided for counting the number of revolutions of shaft 235 so that the position of scoop 222 can be determined by controller 228 at any time.

One end of pivot rod 226 passes through an elongated opening 243 in inner side wall 207 of housing 201 and is pivotably supported by sleeve 244. Two slightly flexible fingers 245, 246 are mounted to pivot rod 226 between sleeve 244 and inner side wall 207 of housing 201. Finger 245 has a circular knob 247 attached to it on the side facing inner side wall 207. Finger 246 contains a wedge-shape protrusion 248 which protrudes from the side of finger 246 facing sleeve 244. Sleeve 244 also contains a wedge-shape protrusion 249 which protrudes from the side of sleeve 244 facing inner side wall 207 for engaging with wedge-shape protrusion 248.

Similarly, the other end of pivot rod 226 passes through an opening 250 in inner side wall 208 and is pivotably supported by sleeve 251. Fingers 252, 253, which are slightly flexible, are mounted to pivot rod 226 between sleeve 251 and inner side wall 208 of housing 201. Fingers 252 and 253 also contain a circular knob 254 and a wedge-shape protrusion 255 in the respective order. Sleeve 251 contains a wedge-shape protrusion 256 which protrudes from the side of sleeve 251 facing inner side wall 208 for engaging with wedge-shape protrusion 255 on finger 253. Flexible flaps or covers (not shown) may be attached to inner side walls 207 and 208 above and below openings 243 and 250 to prevent particulate litter from passing through openings 243 and 250.

Inner side wall 207 of housing 201 has a rectangular panel 257 attached to it on the side facing outer side wall 204. Panel 257 has seven flat protruding portions 258, 259, 260, 261, 262, 263 and 264 which can be seen in FIG. 10. Flat protruding portions 262, 263 and 264 have toothed top edges 265, 266 and 267 in the respective order.

For the purpose of illustration, the non-protruding portion of panel 257 is defined as comprising three horizontal track sections 268, 269, 270 and six upright track sections 271, 272, 273, 274, 275, 276. Horizontal track sections 268 and 270 extend from upright track section 271 to upright track section 276 while horizontal track section 269 only extends from upright track section 271 to upright track section 274. Panel 257 also contains nine wedge-shape protrusions 277, 278, 279, 280, 281, 282, 283, 284 and 285 which protrude from various track sections on panel 257.

Similarly, inner side wall 208 of housing 201 has a rectangular panel 286 attached to it. Panel 286 includes seven flat protruding portions and nine wedge-shape protrusions (not shown) which are mirror images of the flat protruding portions and wedge-shape protrusions on panel 257.

FIGS. 11A to 11F are sectional side views of the middle and rear sections of the animal waste disposal system 200 showing six different positions of the waste-removing mechanism during a process of removing animal's waste from the rear section of litter tray 211. The litter and animal's waste are not depicted in FIGS. 11A to 11F in order to avoid confusion but it can be seen that the waste-scooping process for this embodiment is similar to the process described for the first embodiment.

Figure 11A:
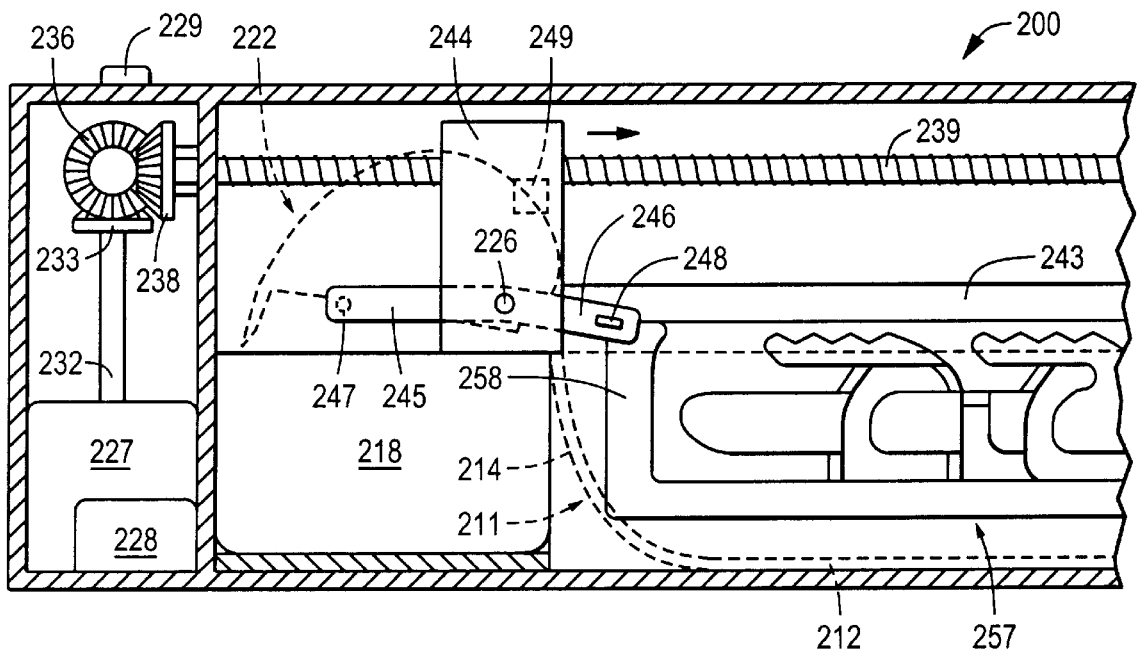
FIGS. 11A–11F are sectional side views of the second embodiment showing six different positions of the scoop and its drive mechanism during a waste-removing operation.

The waste-removing operation begins with scoop 222 in its storage position shown in FIG. 11A. The user presses push button 229 to cause controller 228 to energize electric motor 227. Electric motor 227 rotates shaft 232 which is connected to bevel gear 233 in the clockwise direction (with respect to FIG. 8). Bevel gear 233 in turn rotates bevel gear 234 which is connected to horizontal shaft 235. The motion is transferred to threaded rod 239 by means of bevel gear 236 and 238, and to threaded rod 241 by means of bevel gears 237 and 240. The rotation of threaded rods 239 and 241 causes sleeves 244, 251 and scoop 222 to move slowly towards front wall 203 of housing 201.

Figure 11B:
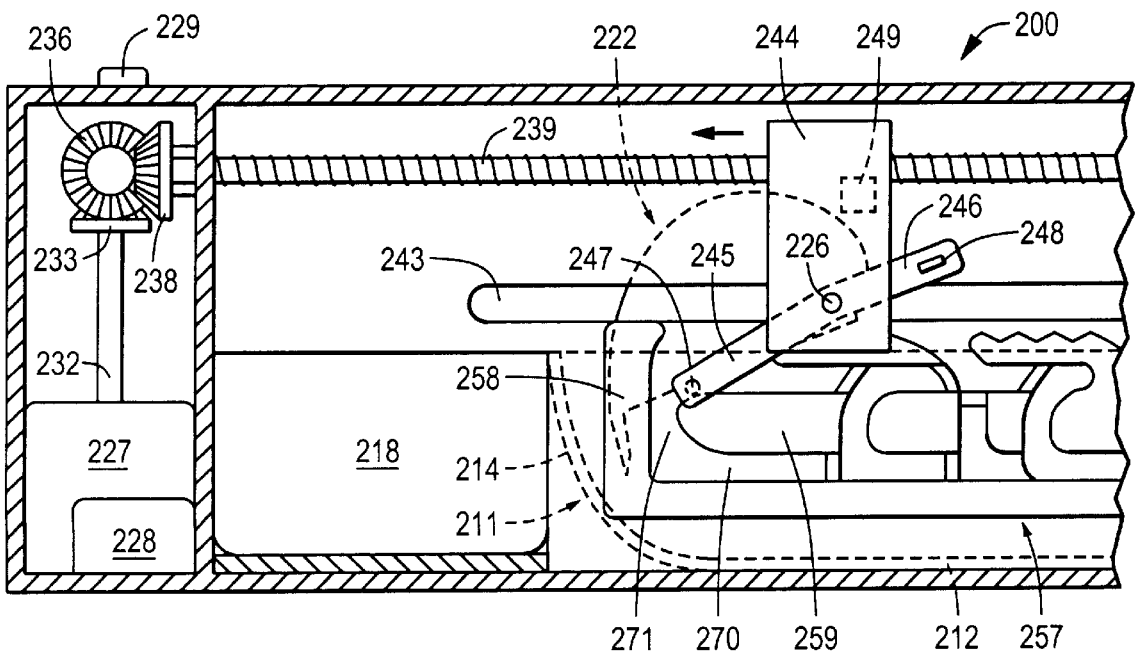
Figure 11C:
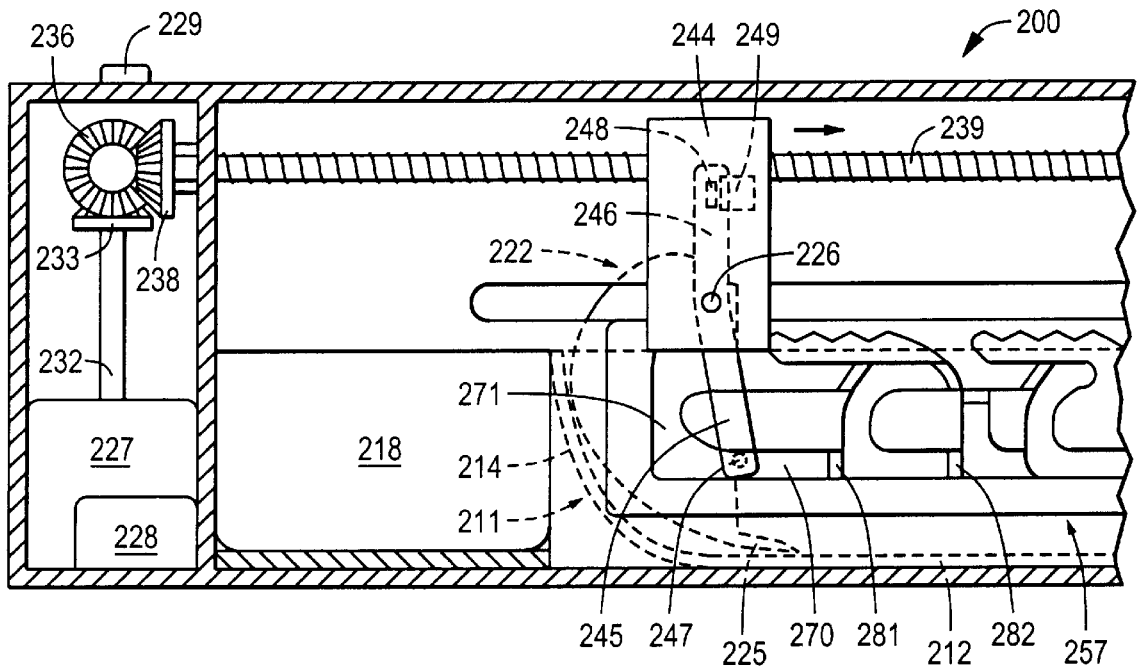
Figure 11D:
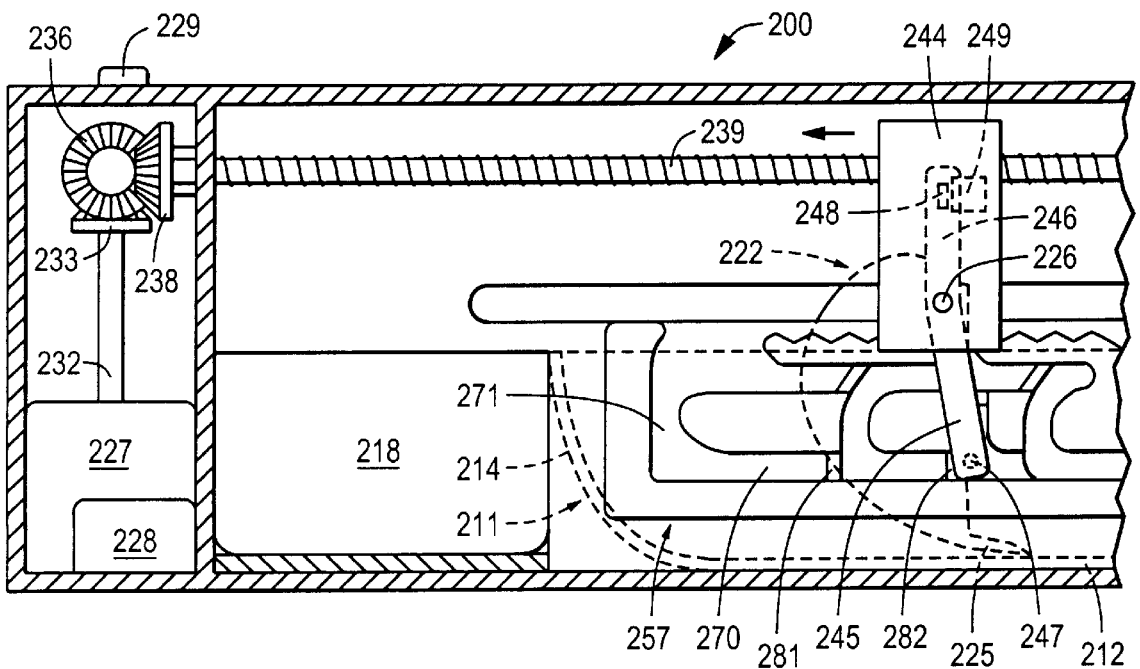
Figure 11E:
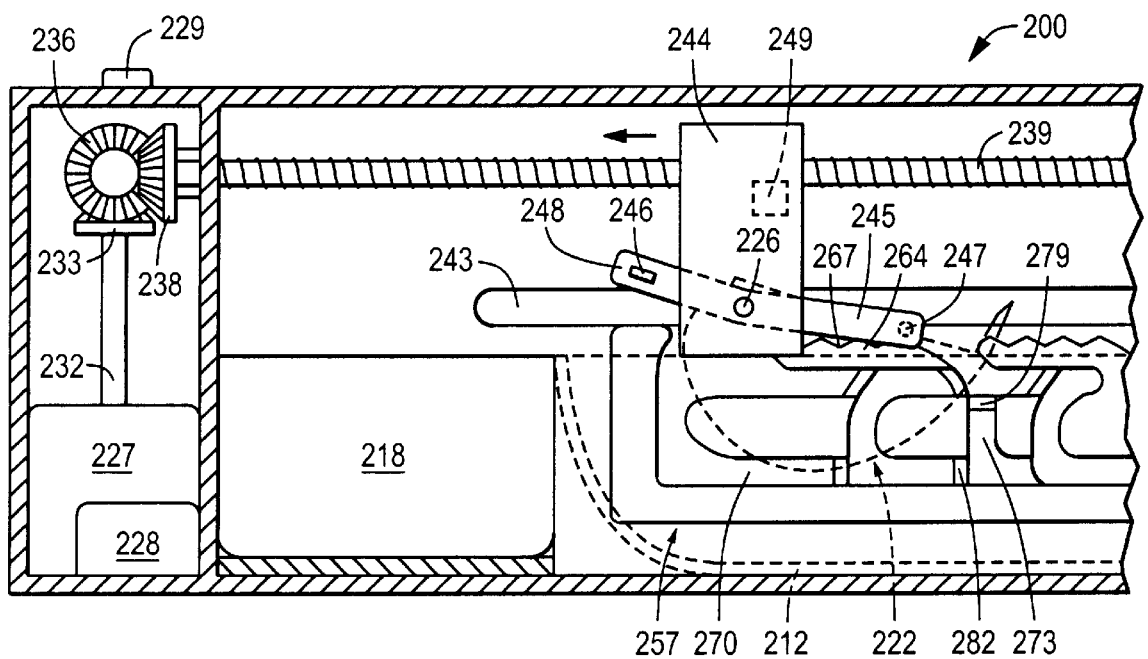
Figure 11F:
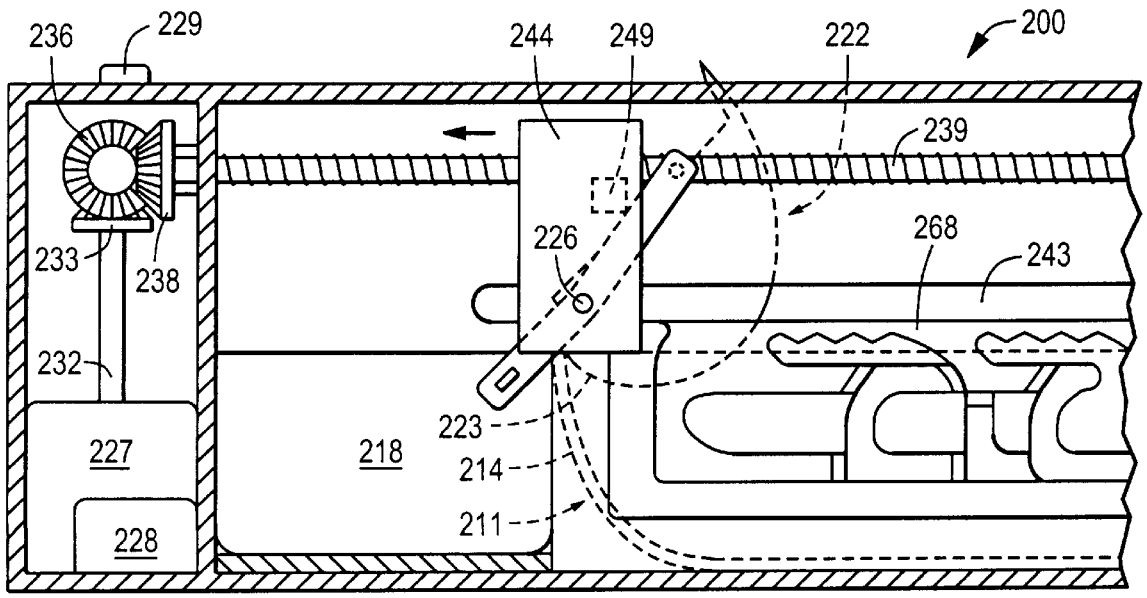

After circular knob 247 on finger 245 moves past flat protruding portion 258 on panel 257 and circular knob 254 (shown in FIG. 8) moves past a similar flat protruding portion (not shown) on panel 286, scoop 222 is forced by its own weight to rotate about pivot rod 226 into the position shown in FIG. 11B. Circular knob 247 on finger 245 drops on to flat protruding portion 259 on panel 257 and circular knob 254 on finger 252 drops on to corresponding flat protruding portion (not shown) on panel 286.

At this point controller 228 reverses the current applied to electric motor 227 causing shaft 232 to rotate in the counterclockwise direction. The motion is transferred to threaded rods 239 and 241 causing sleeves 244 and 251 to move in the direction towards the rear end of housing 201. Scraper 225 which is connected to scoop 222 pushes against rear curved end 214 of litter tray 211 causing scoop 222 to pivot further and move into the position shown in FIG. 11C.

During the same period of time, circular knob 247 on finger 245 moves downwards along upright track section 271 on panel 257 and then towards the front end of housing 201 along lower horizontal track section 270 as circular knob 254 on finger 252 moves along corresponding track sections (not shown) on panel 286. Wedge-shape protrusion 248 on finger 246 comes into contact with wedge-shape protrusion 249 on sleeve 244 causing finger 246 to bend slightly towards inner side wall 207 of housing 201. As wedge-shape protrusion 248 on finger 246 continues its movement past wedge-shape protrusion 249 on sleeve 244, finger 246 straightens itself and pushes wedge-shape protrusion 248 closer to sleeve 244. Wedge-shape protrusion 248 is therefore prevented from moving back in the opposite direction by wedge-shape protrusion 249 on sleeve 244. Similarly, wedge-shaped protrusion 255 on finger 253 moves past wedge-shaped protrusion 256 on sleeve 251 and is prevented from moving back in the opposite direction by wedge-shape protrusion 256.

Controller 228 then reverses the current applied to electric motor 227 to cause sleeves 244, 251 and pivot rod 226 to move laterally towards the front end of housing 201. During this period of time, scoop 222 is prevented from rotating by the engagements of wedge-shape protrusions 248, 255 with wedge-shape protrusions 249, 256 in the respective order. Scoop 222 therefore continues to move towards the front end of housing 201 with scraper 225 scraping bottom floor 212 of litter tray 211 until it reaches the position shown in FIG. 11D. Circular knob 247 moves along the lower horizontal track section 270 past wedge-shape protrusions 281 and 282 on panel 257 while circular knob 254 moves along the corresponding track section (not shown) on panel 286. After circular knob 247 reaches the position shown in FIG. 11D, it is prevented from moving back towards the rear end of housing 201 by wedge-shape protrusion 282 on panel 257. Circular knob 254 is also prevented from moving towards the rear end of housing 201 by the corresponding wedge-shape protrusion on panel 286.

Controller 228 then reverses the current applied to electric motor 227 to cause sleeves 249 and 251 to move towards the rear end of housing 201 again. Since circular knob 247 is prevented from moving along lower horizontal track section 270 towards the rear end of housing 201, it is forced to move upwards along upright track section 273 until scoop 222 reaches the position shown in FIG. 11E. Circular knob 254 is also prevented from moving horizontally by the corresponding wedge-shape protrusion (not shown) on panel 286 and is forced to moved upwards in the same manner.

As sleeves 244, 251 and scoop 222 continue to move laterally towards the rear end of housing 201, circular knob 247 on finger 245 is dragged over toothed edge 267 on flat protruding portion 264. This dragging action produces a vibration which is transferred through finger 245 and pivot rod 226 to scoop 222. At the same time, circular knob 254 is dragged against a toothed edge on the corresponding flat protruding portion of panel 286 to produce the same amount of vibration at both ends of scoop 222. The vibration of scoop 222 helps to improve the separation of animal's waste from the particulate litter (not shown).

The lateral movement of scoop 222 brings curved surface 223 into contact with rear curved end 214 of litter tray 211. This causes scoop 222 to pivot upwards into the position shown in FIG. 11F. Sleeves 244 and 251 continue to move further towards the rear end of housing 201 and finally causes scoop 222 to drop into its original position shown in FIG. 11A.

It is obvious that by varying the distance sleeves 244 and 251 move laterally in each direction, scoop 211 can be made to pivot at different locations to remove animal's waste from the middle and front sections of litter bed 217 in a similar manner.

Figure 10:
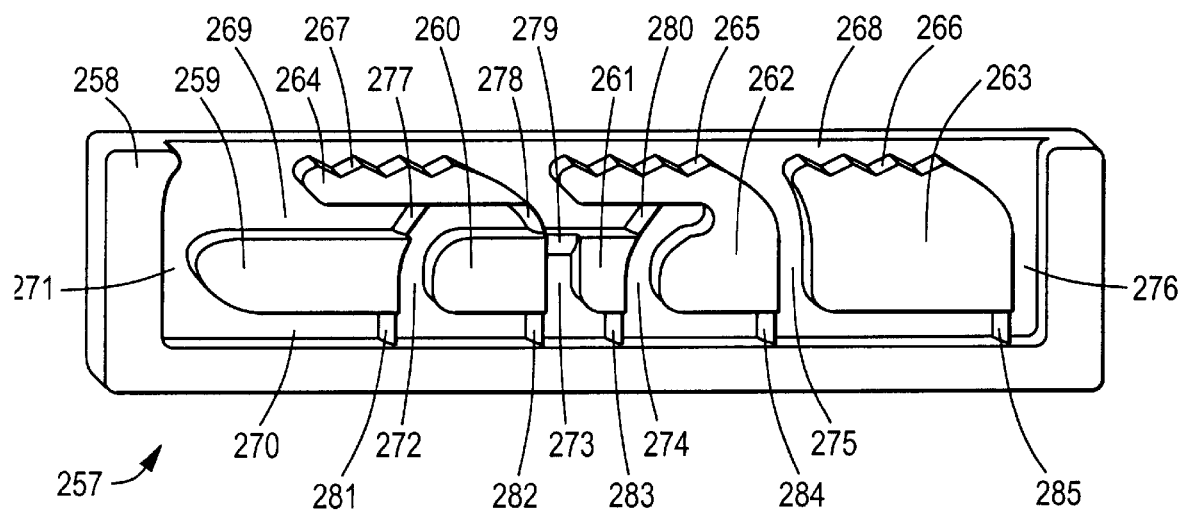
FIG. 10 is an isolated view of one of the panels in the second embodiment which contains a plurality of guide rails for causing the scoop to rotate as its axis of rotation is moved laterally.

In order to remove animal's waste from the middle section of litter bed 217, controller 228 reverses the electric current applied to electric motor 227 to move sleeves 244 and 251 towards the front end of housing 201 until circular knob 247 has moved past wedge shape protrusion 277 on horizontal track section 269 (shown in FIG. 10). Controller 228 then reverses the current to electric motor 227 to cause sleeves 244 and 251 to move towards the rear end of housing 201. This causes scoop 211 to pivot with circular knob 247 moving downwards along upright track section 272. During the same period of time, circular knob 254 also moves downwards along corresponding track section (not shown) on panel 286. Controller 228 then reverses the current to electric motor 227 two more times to complete the process of scooping animal's waste from the middle section of litter bed 217. Circular knob 247 is moved laterally along lower horizontal track section 270 past wedge-shape protrusions 282, 283, 284 and upwards along upright track section 275. It is then moved laterally towards the rear end of housing 201 along upper horizontal track section 268 over tooth edges 265 and 267 on flat protruding portions 262 and 264. During the same period of time, circular knob 254 also moves along corresponding track sections (not shown) on panel 286. After reaching rear curved end 214 of litter tray 211, scoop 222 is pivoted into its inverted position over waste container 218 in the same manner as before.

In order to remove animal's waste from the front section of litter bed 217, controller 228 reverses the electric current applied to electric motor 227 to move sleeves 244 and 251 towards the front end of housing 201 until circular knob 247 has moved past wedge shape protrusion 280 on horizontal track section 269 (shown in FIG. 10). Controller 228 then reverses the current to electric motor 227 to cause sleeves 244 and 251 to move towards the rear end of housing 201. This causes scoop 211 to pivot with circular knob 247 moving downwards along upright track section 274. During the same period of time, circular knob 254 also moves downwards along corresponding track section (not shown) on panel 286. Controller 228 then reverses the current to electric motor 227 two more times to complete the process of scooping animal's waste from the front section of litter bed 217. Circular knob 247 is moved laterally along lower horizontal track section 270 past wedge-shape protrusions 284, 285 and upwards along upright track section 276. It is then moved laterally towards the rear end of housing 201 along upper horizontal track section 268 over tooth edges 266, 265 and 267 on flat protruding portions 263, 262 and 264. During the same period of time, circular knob 254 also moves along corresponding track sections (not shown) on panel 286. After reaching rear curved end 214 of litter tray 211, scoop 222 is pivoted into its inverted position over waste container 218 and remains in this position until litter bed 217 needs to be cleaned or processed again.

A simple waste-removing mechanism has been chosen for this second embodiment for the purpose of illustration and it is obvious to those skilled in the art that several modifications and improvements can be made. For example, panels 257 and 286 may be attached to outer side walls 205 and 204 of housing 201 instead of inner side walls 207 and 208. Scoop 222 may be slidably movable in different directions or rotatable about two horizontal axes in stead of one so that it can move through a more complicated path for more efficient scooping.

One advantage of this embodiment over the first embodiment is that it contains a lot less moving parts and can be easier and less expensive to produce after the tooling has been made. One disadvantage of this embodiment is that the total number of predetermined sections of litter bed and the size of each section which can be separately cleaned or processed are limited by the patterns on panels 257 and 286.

Description of the Third Embodiment

It is also obvious to those skilled in the art that either of the two waste-removing mechanisms described above may be made to operate in a fully automatic fashion with the use of one or more sensors for detecting the presence of an animal inside the housing. However, since most types of animal sensor are known to malfunction from time to time and since the waste-removing mechanism must be quite powerful to be able to move a substantial amount of animal's waste and particulate litter inside the litter tray, there is a possibility that the waste-removing mechanism will injure an animal during its fully automatic operation.

A solution to this problem is to provide a partition or cover which automatically extends across the bed of particulate litter before the waste-removing operation begins to make the waste-removing mechanism inaccessible to the animal. The third embodiment of the present invention contains this type of partition which is attached to the ceiling of a removable hood as shown in FIGS. 12, 13 and 14.

For the purpose of illustration the waste-removing mechanism in this embodiment is assumed to be of the same type as the one used in the second embodiment although the mechanism used in the first embodiment or any other similar waste-removing mechanism may be employed.

Figure 12:
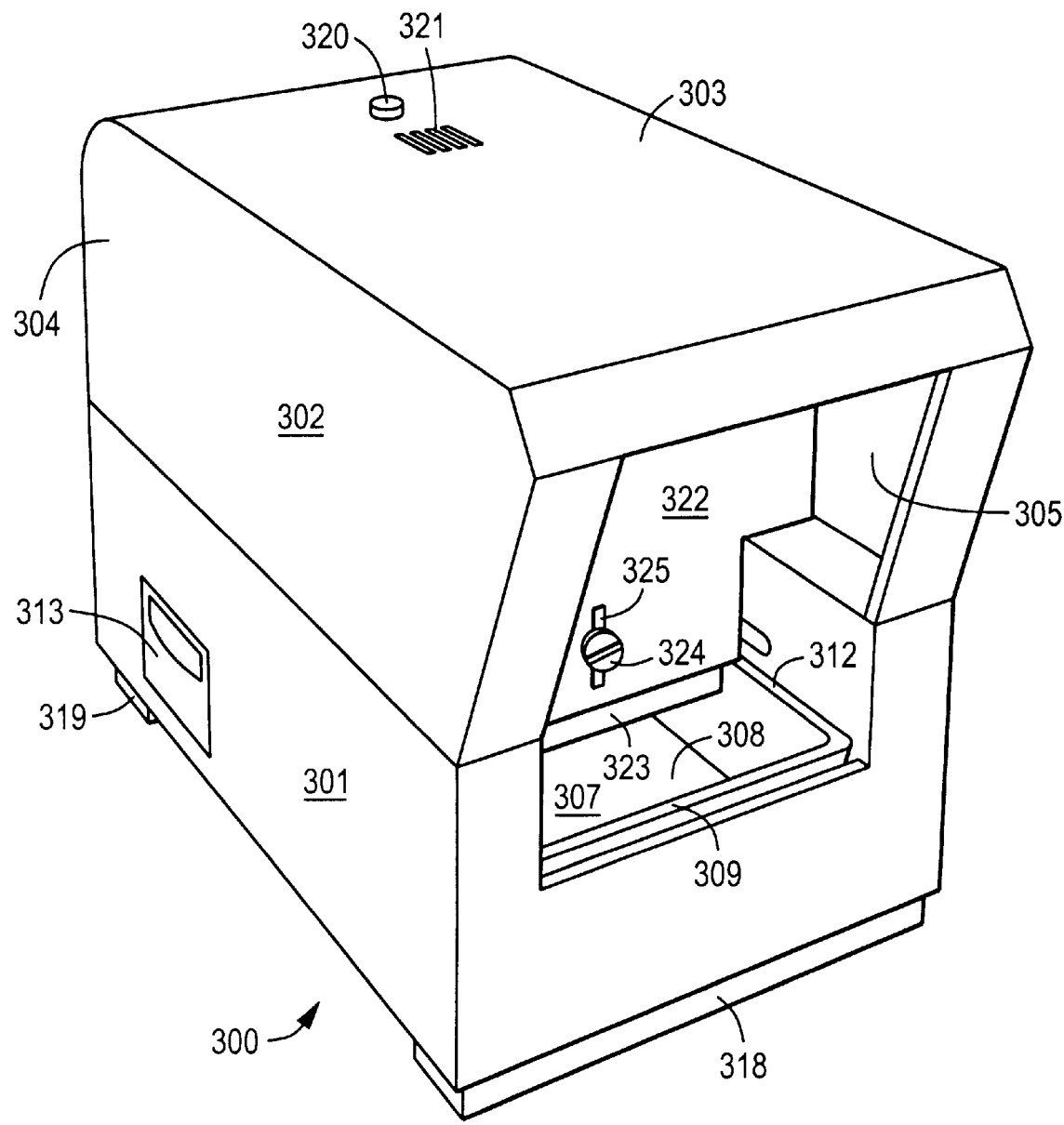
FIG. 12 is a perspective view of the third embodiment of the present invention showing a covered litter box with a retractable partition in an intermediate position above the litter tray.
Figure 13:
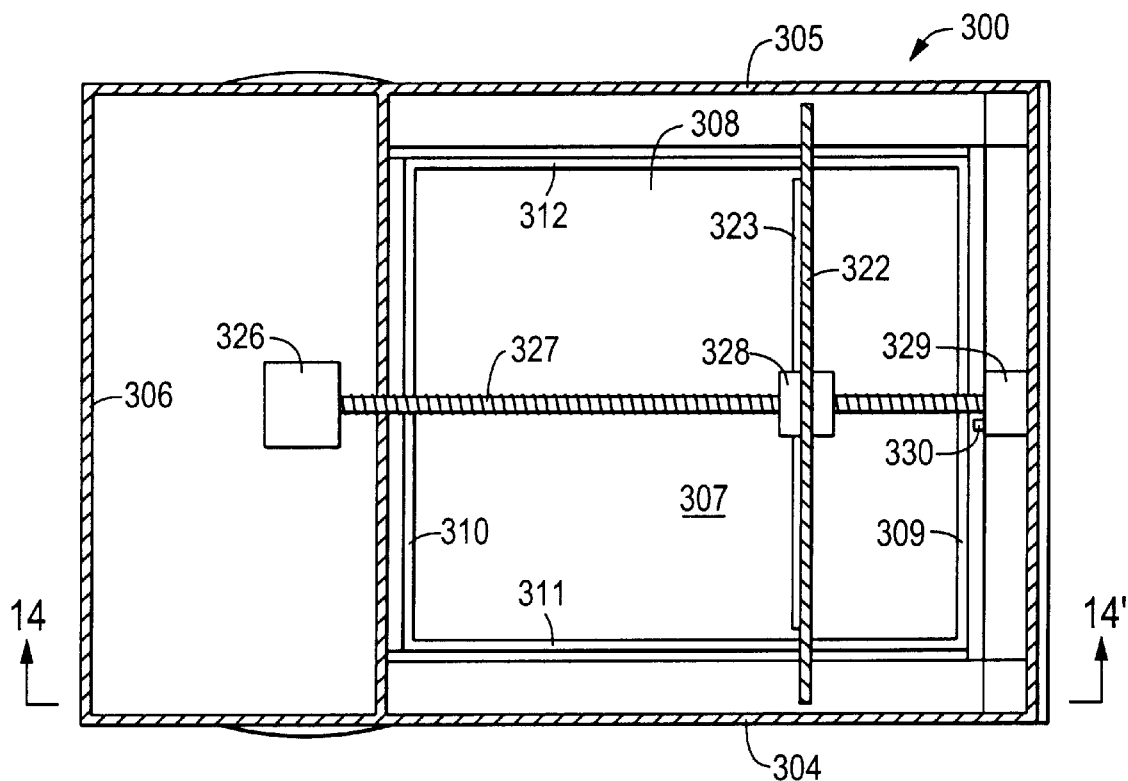
FIG. 13 is a top view of the third embodiment taken along line 13–13' of FIG. 14 with the retractable partition in an intermediate position above the litter tray.
Figure 14:
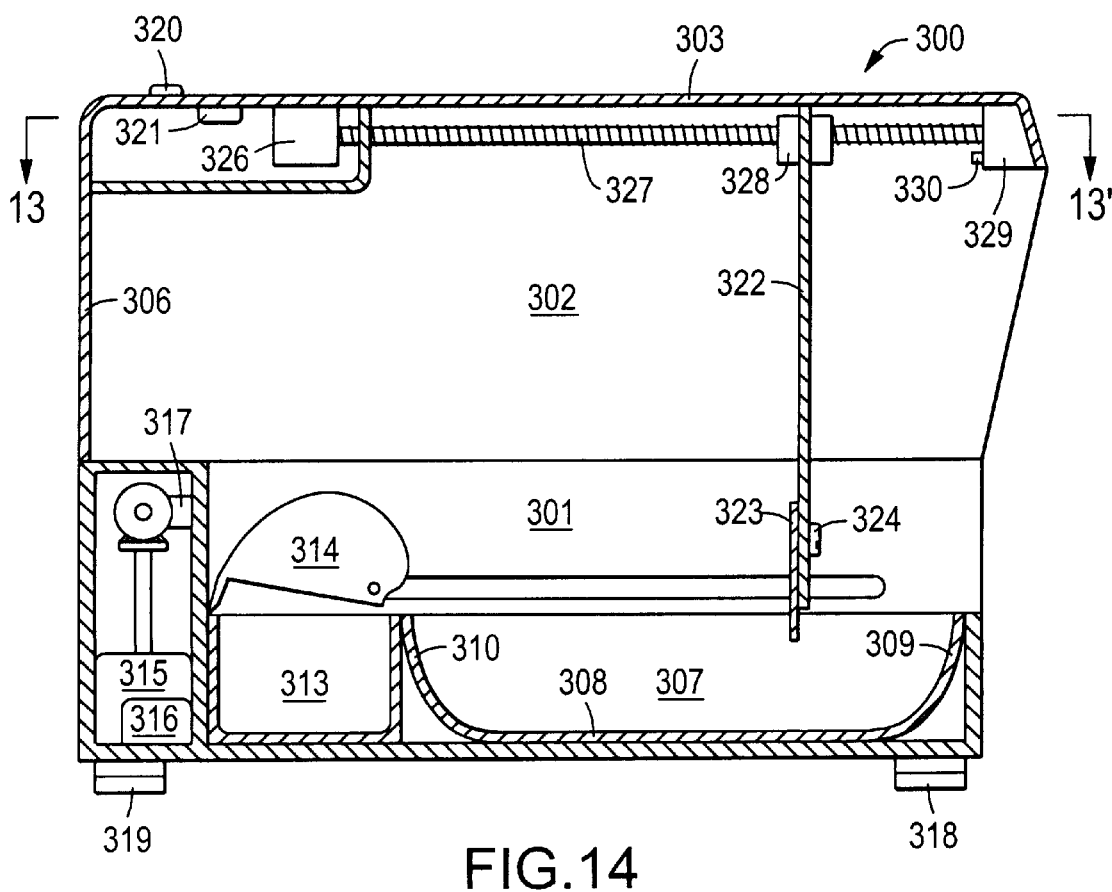
FIG. 14 is a sectional side view of the third embodiment taken along line 14–14' of FIG. 13.

The animal waste disposal system 300 which is shown in FIGS. 12, 13 and 14 includes a housing 301 which is similar to the housing of the second embodiment. A removable hood 302 is shown to include a top panel 303, two opposite side walls 304, 305 and a rear end wall 306.

A litter tray 307 is positioned inside housing 301 in the usual manner. Litter tray 307 includes a bottom floor 308, a front curved end 309, a rear curved end 310 and two opposite side walls 311, 312. A waste container 313 is positioned near the rear end of housing 301. A scoop 314 is shown in FIG. 14 in its inverted storage position on top of waste container 313.

An reversible electric motor 315 and a controller 316 are mounted to housing 301. A revolution counter 317 is provided to allow controller 316 to determine the position of scoop 314 at any time. Two animal sensors 318 and 319 in the form of weight sensors are employed for detecting the presence of an animal inside housing 301.

A push button 320 is provided on top of panel 303 of hood 302 and may be used for manually starting or terminating a waste-removing operation or for resetting the system after an incomplete waste-removing operation. An audible alarm 321 is provided for alerting the user in the event that the waste-removing operation cannot be completed automatically.

Figure 15A:
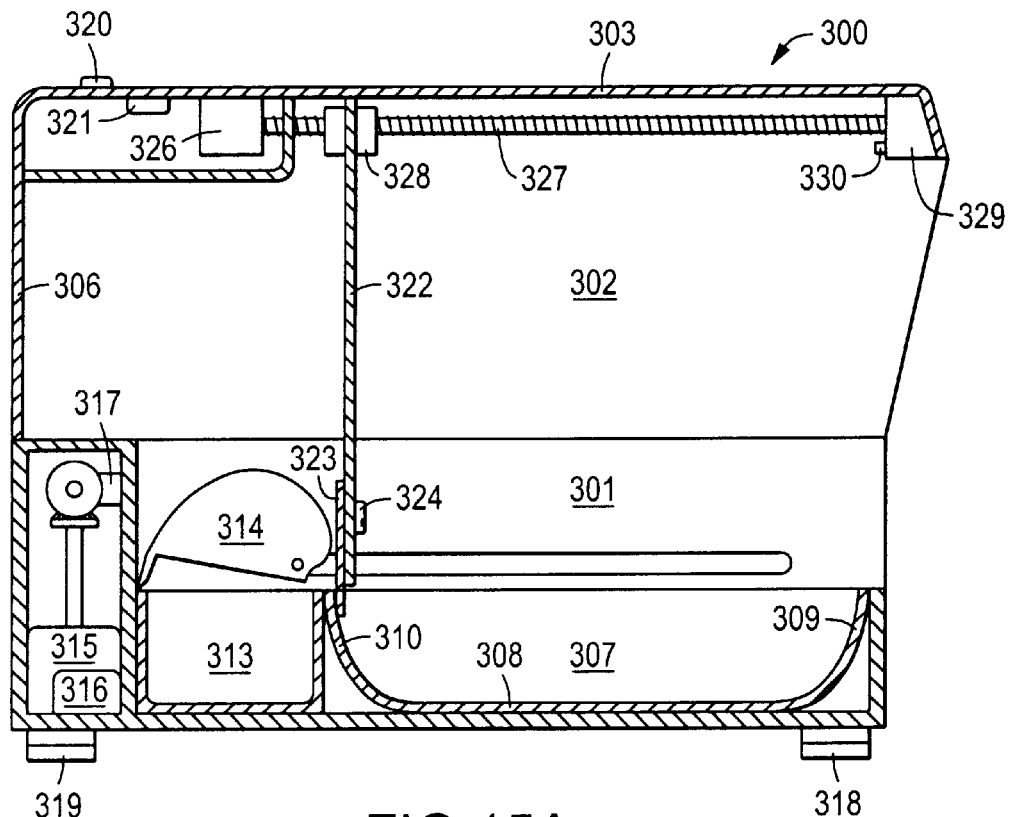
FIGS. 15A–15B are two sectional side views of the third embodiment showing two end positions of the retractable partition.
Figure 15B:
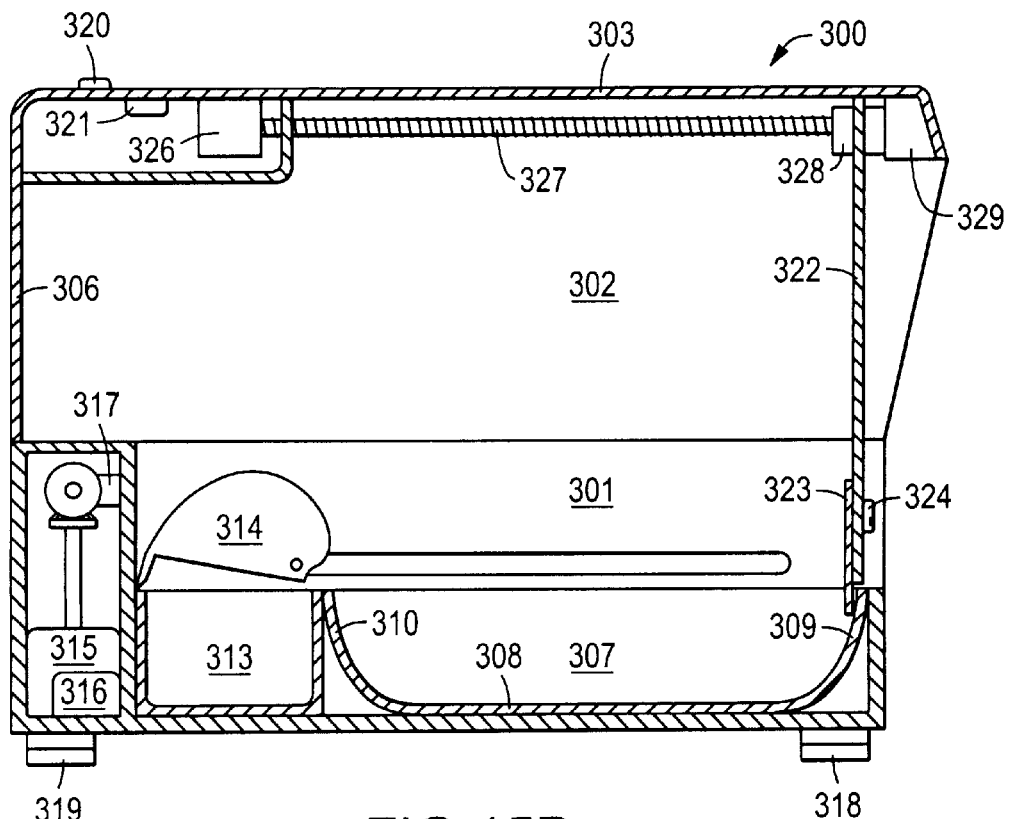
Figure 16:
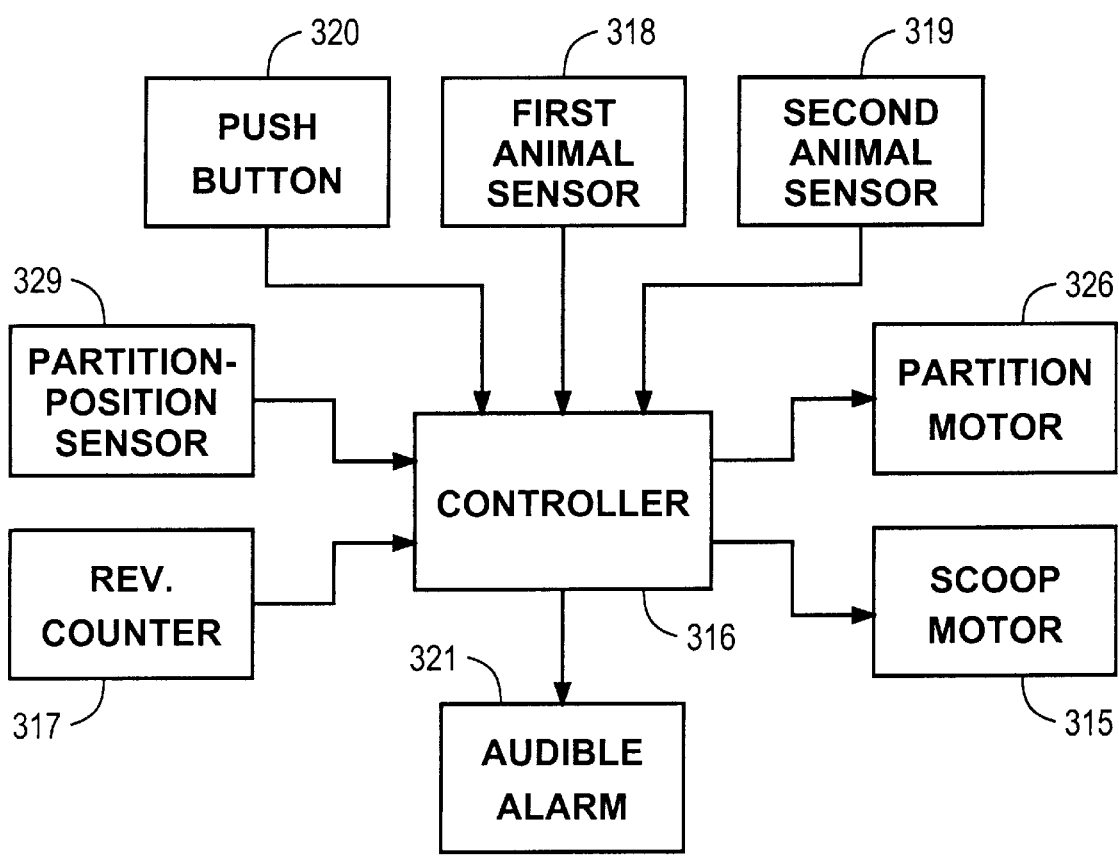
FIG. 16 is a block diagram showing a control system which can be used for controlling the operation of the third embodiment of the present invention.

A partition 322 extends substantially between opposite side walls 304 and 305 of hood 302 and is movable laterally over the length of litter tray 307 between the two end positions shown in FIGS. 15A and 15B. Partition 322 has an adjustable panel 323 attached to its lower end. The height of adjustable panel 323 above bottom floor 308 of litter tray 307 may be adjusted by means of a screw 324 which moves vertically along a slot 325 in partition 322.

The drive mechanism for moving partition 322 includes a second reversible electric motor 326, a threaded rod 327 and a coupler 328. Electric motor 326 is controlled by controller 316. Coupler 328 is attached to partition 322 and moves along threaded rod 327 when the latter is rotated by electric motor 326 in either direction. Unlike the mechanism for moving scoop 314 which must be capable of moving substantial amounts of animal's waste and particulate litter, the mechanism for moving partition 322 does not have to be very powerful and can be made in such a way that it cannot cause an injury to an animal.

A partition position sensor 329 is provided in the form of a switch which operates by means of a push rod 330. It sends an electrical signal to controller 316 when partition 322 reaches its fully extended position shown in FIG. 15B. An additional switch may be provided for sending a different signal to controller 316 when partition 322 reaches its fully retracted position shown in FIG. 15A.

When the system is in its standby state, scoop 314 rests in its storage position on top of waste container 313 and partition 322 is in its storage position above rear curved end 310 of litter tray 307 as shown in FIG. 15A.

When an animal steps out of housing 301, animal sensors 318 and 319 send electrical signals to controller 316. Upon receiving these signal, controller 316 starts its built-in delay timer with a delay period set for T seconds. The value of T may be adjustable by the user by means of a dial, a keypad, jumpers or switches connected to controller 316. If an animal re-enters housing 301 during this period of T seconds, the timer is reset and the count down begins again as soon as the animal leaves housing 301.

When the count-down value reaches zero, controller 316 energizes electric motor 326 to move partition 322 towards the front end of litter tray 307. If an animal returns to housing 301 at this time and obstructs the forward movement of partition 322, the latter is retracted to its storage position shown in FIG. 15A and the count down begins again as soon as the animal leaves housing 301.

If no obstruction occurs, partition 322 continues to move towards front curved end 309 of litter tray 307 until it reaches its fully extended position shown in FIG. 15B. Partition position sensor 329 sends an electrical signal to controller 316. Upon receiving this signal, controller 316 de-energizes electric motor 326 and energizes electric motor 315 to begin the waste-removing operation. The waste-removing operation of this embodiment is the same as that of the second embodiment described above.

If the waste-removing operation ends successfully, controller 316 re-energizes electric motor 326 to retract partition 322 to its storage position shown in FIG. 15A and the system returns to its standby state to wait for an animal to re-enter housing 301.

If the movement of scoop 314 is obstructed for any reason and the waste-removing operation cannot be completed automatically, the system's operation is terminated by controller 316 and audible alarm 321 is activated to notify the user of the problem condition.

This system can be totally safe for an animal while operating in a fully automatic fashion if the mechanism for moving partition 322 is not powerful enough to injure the animal and the gap between adjustable panel 323 and bottom floor 308 of litter tray 307 is small enough to prevent the animal from getting behind partition 322.

The user may adjust the height of adjustable panel 323 so that the gap between panel 323 and bottom floor 308 of litter tray 307 is smaller than the size of the smallest animal in the household. For example, the size of the gap may be adjustable between 2 inches and 4 inches. A tool for measuring the size or width of a small animal may also be provided.

Figure 17:
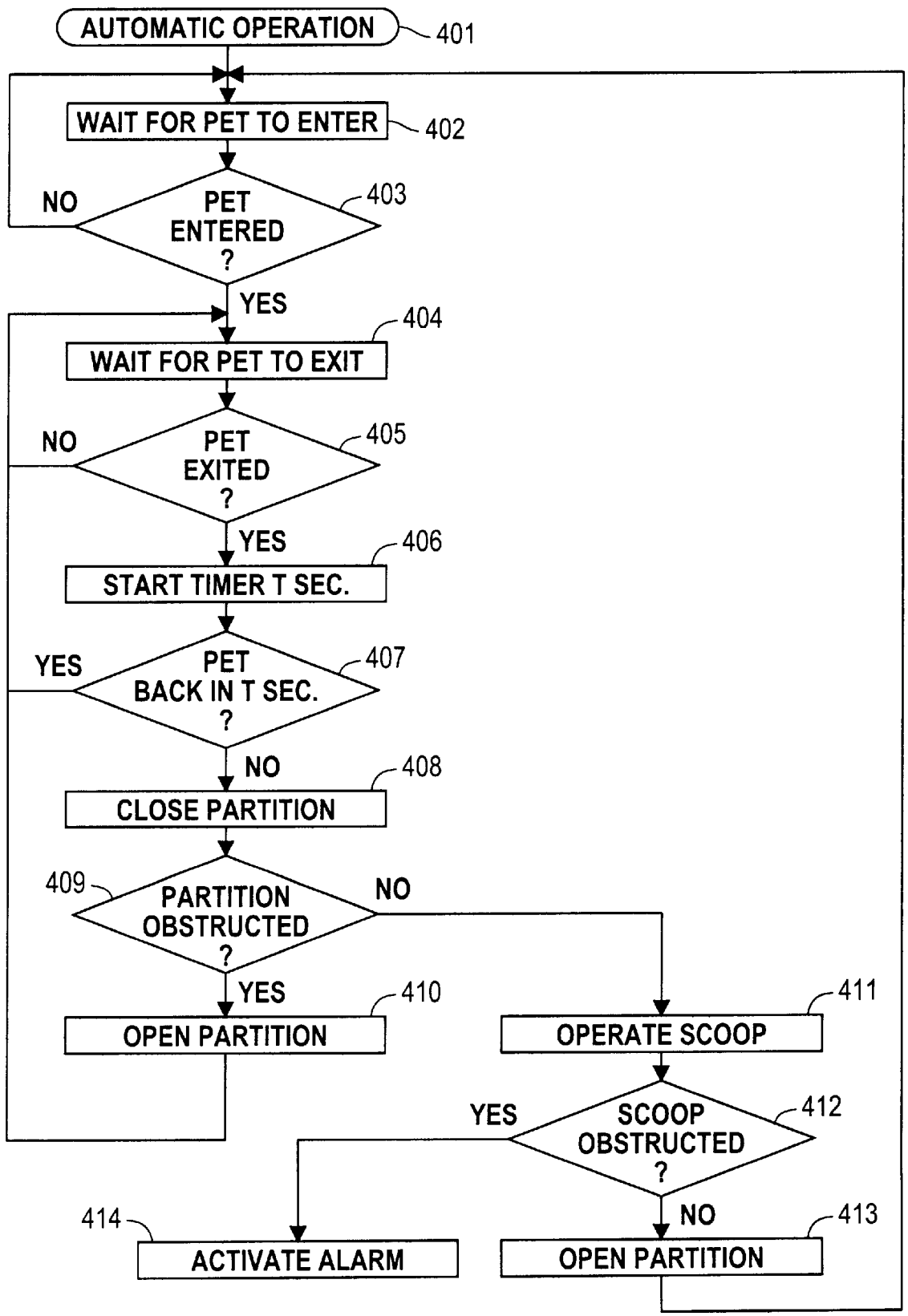
FIG. 17 is a flow diagram showing a logic sequence which can be used to control the operation of the third embodiment of the present invention.
Figure 18:
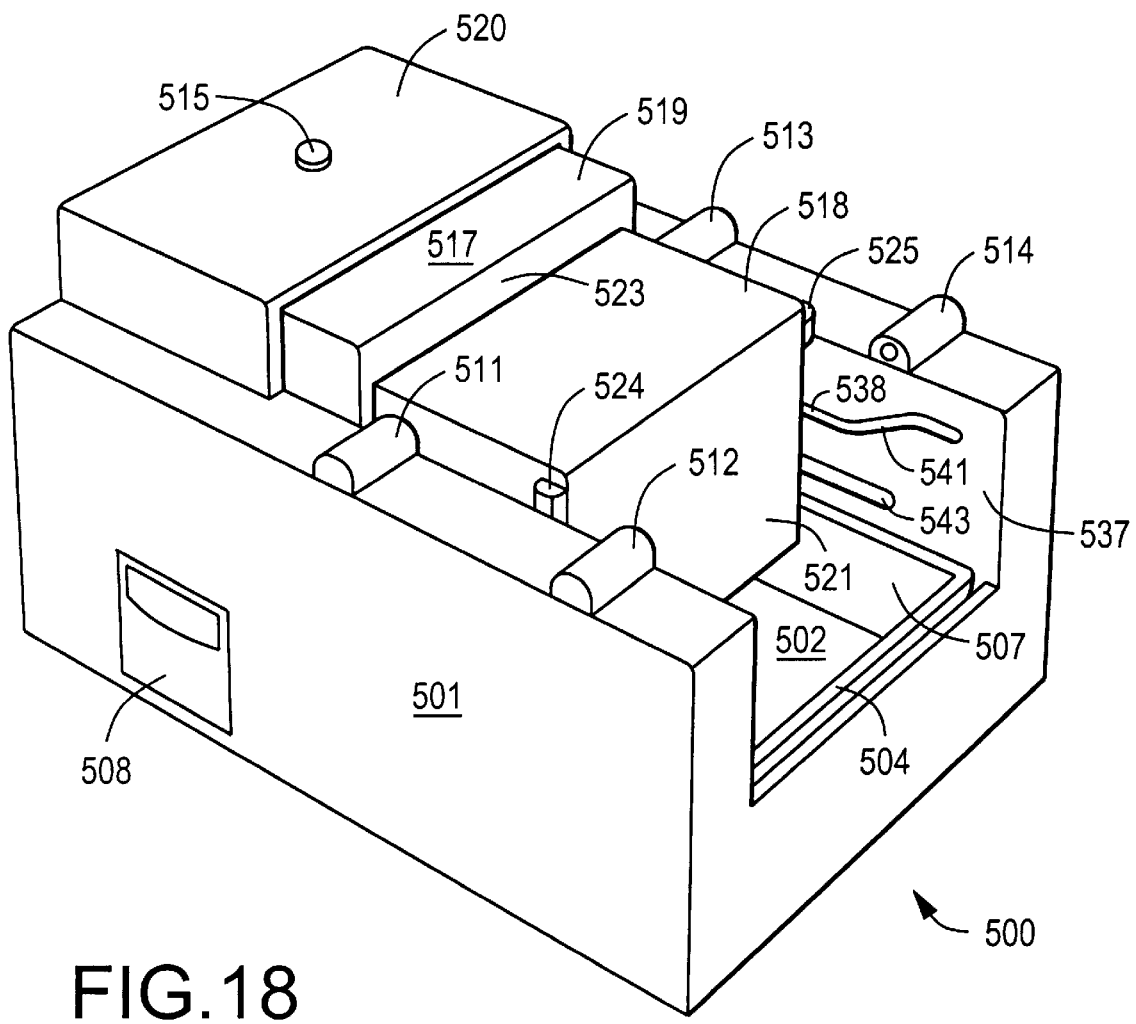
FIG. 18 is a perspective view of the fourth embodiment of the present invention showing the retractable cover in its intermediate position above the litter tray.
Figure 19:
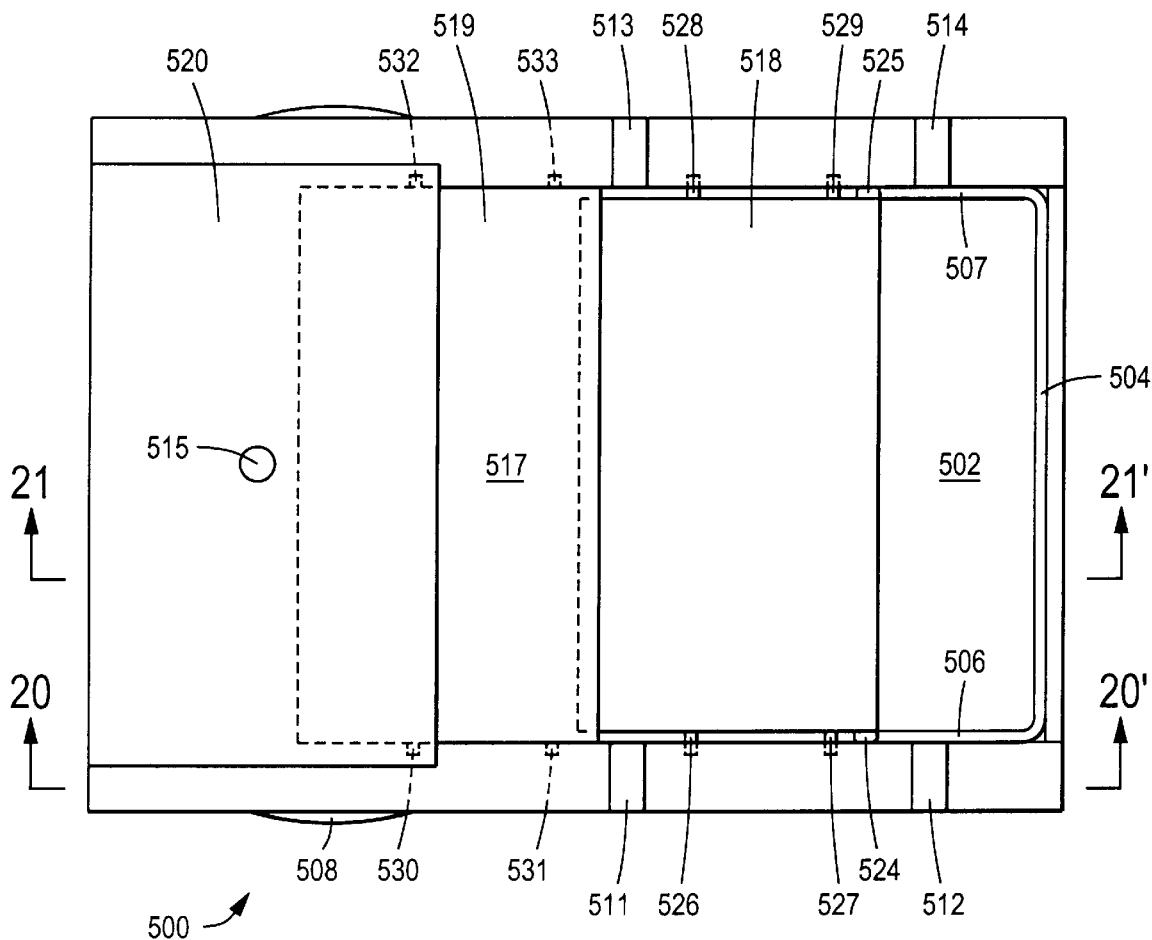
FIG. 19 is a top view of the fourth embodiment showing the retractable cover in its intermediate position above the litter tray.

FIG. 17 is a flow diagram showing a logic sequence for controlling the automatic operation of animal waste disposal system 300.

"AUTOMATIC OPERATION" block 401 represents the initialization of the system's automatic operation which may involve connecting the system to a household power supply.

"WAIT FOR PET TO ENTER" block 402 represents the system's standby state in which controller 316 periodically tests the outputs from animal sensors 318 and 319 to determine if an animal has entered housing 301.

"PET ENTERED ?" block 403 represents a decision-making process performed by controller 316 based on the outputs from animal sensors 318 and 319. If none of the sensors indicates the presence of an animal inside housing 301, the logic recycles to block 402 and continues to wait for an animal to enter housing 301. If one or both of the sensors indicate the presence of an animal inside housing 301, the logic proceeds to "WAIT FOR PET TO EXIT" block 404.

During "WAIT FOR PET TO EXIT" block 404, controller 316 continues to test the outputs from animal sensors 318 and 319 to determine if the animal has left housing 301.

"PET EXITED ?" block 405 represents another decision-making process performed by controller 316 based on the outputs from animal sensors 318 and 319. If at least one of these sensors indicates that the animal is still present inside housing 301, the logic recycles to block 404 and continues to wait for the animal to exit. If both sensors 318 and 319 indicate that the animal has left housing 301, the logic proceeds to "START TIMER T SEC." block 406.

"START TIMER T SEC." block 406 represents the starting of the controller's delay timer with an initial count-down or delay value set at T seconds.

"PET BACK IN T SEC.?" block 407 represents another decision-making process performed by controller 316 based on the outputs from animal sensors 318 and 319. If at least one of these sensors indicates that the animal has returned to housing 301 during the delay period of T seconds, the logic recycles to block 404 and waits for the animal to exit again. If none of the animal sensors indicates that the animal has returned during the delay period of T seconds, the logic proceeds to "CLOSE PARTITION" block 408.

"CLOSE PARTITION" block 408 represents the closing of partition 322. Electric motor 326 is energized by controller 316 for a period of time long enough for partition 322 to move from its fully retracted position shown in FIG. 15A to its fully extended position shown in FIG. 15B.

"PARTITION OBSTRUCTED ?" block 409 represents a decision-making process performed by controller 316 based on the output from partition position sensor 329. If this output indicates that there has been an obstruction and partition 322 cannot move into its fully-extended position shown in FIG. 15B, the logic proceeds to "OPEN PARTITION" block 410. If the output from partition position sensor 329 indicates that partition 322 has successfully reached its fully extended position shown in FIG. 15B, the logic proceeds to "OPERATE SCOOP" block 411.

"OPEN PARTITION" block 410 represents the energizing of electric motor 326 to move partition 322 back to its fully-retracted position shown in FIG. 15A after an obstruction has occurred. After partition 322 is fully retracted, the system recycles to "WAIT FOR PET TO EXIT" block 404.

"OPERATE SCOOP" block 411 represents the operation of scoop 314 to remove animal's waste from litter tray 307. As mentioned earlier, the waste-removing process of this embodiment is the same as that of the second embodiment described above. "SCOOP OBSTRUCTED ?" block represents another decision making process performed by controller 316 based on the output from revolution counter 317. When controller 316 determines that the waste-removing operation has been completed successfully, the logic proceeds to "OPEN PARTITION" block 413. If scoop 314 is obstructed for any reason and the waste-removing operation cannot be completed automatically, the logic proceeds to "ACTIVATE ALARM" block 414.

"OPEN PARTITION" block 413 represents the energizing of electric motor 326 to retract partition 322 to its storage position shown in FIG. 15A. After partition 322 is fully retracted, the logic recycles to block 402 and waits for an animal to enter housing 301 again.

"ACTIVATE ALARM" block 414 represents an activation of alarm 321 by controller 316 to notify the user that the waste-removing operation cannot be completed automatically and that the system needs to be inspected and reset by the user.

It is obvious to those skilled in the art that a more complicated programming may be adopted to provide additional control functions as desired. For example, controller 316 may be programmed to terminate the system's automatic operation after a predetermined number of failed attempts to close or open partition 322.

In order to reduce the amount of odor released into the surrounding area, this type of system may include a carbon filter installed in the hood 302. An electric fan may be used for forcing air out of the hood 302 through this carbon filter to further reduce the amount of odor. The fan may be automatically turned on after an animal leaves housing 301 and turned off after the waste-removing operation is completed.

Description of the Fourth Embodiment

FIGS. 18, 19, 20 and 21 show a fourth embodiment of the present invention with a retractable cover which automatically extends to cover the litter area before the waste-removing operation begins and retracts into the rear end of the housing after the waste-removing operation ends. This embodiment may be preferable to the third embodiment described above in some situations such as when system must be placed in a confined space or when the animal refuses to use a hooded litter box.

Figure 21:
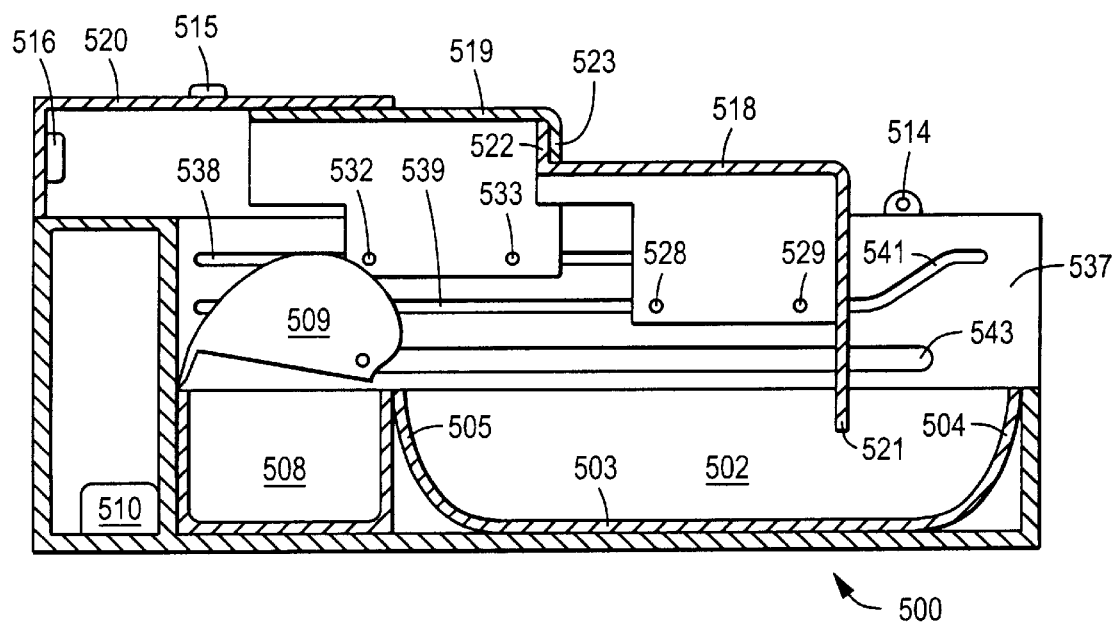
FIG. 21 is a sectional side view of the fourth embodiment taken along line 21–21' of FIG. 19 showing the retractable cover in its intermediate position above the litter tray.

The animal waste disposal system 500 comprises a housing 501 which contains a removable litter tray 502. Litter tray 502 has a bottom floor 503, a front curved end 504, a rear curved end 505 and two opposite side walls 506, 507. A removable waste container 508 is positioned behind litter tray 503. A scoop 509 is shown in FIG. 21 in its inverted storage position above waste container 508. The mechanism for moving scoop 509 is of the same type as in the second and third embodiments and has been omitted in the drawings to avoid confusion.

A controller 510 is mounted to housing 501 for controlling the operation of waste disposal system 500. Photoelectric animal sensors which include two infrared transmitters 511, 512 and two receivers 513, 514 are used in this embodiment in place of weight sensors. These sensors are shown positioned on top of housing 501 for the purpose of illustration but may be positioned slightly lower so that an animal cannot enter housing 501 without being detected. A larger number of transmitters and receivers may be used for added safety. Alternatively a combination of weight sensors and photoelectric sensors may be employed.

A push button 515 is provided on top of housing 501 for use in manually initiating the waste-removing operation. An audible alarm 516 is also provided for alerting the user in the event that a waste-removing operation cannot be completed automatically.

A retractable cover 517, which is shown in FIGS. 18, 19, 20 and 21 in an intermediate position above litter tray 502, includes a first movable section 518, a second movable section 519 and a fixed rear section 520. First movable section 518 has a front panel 521 which extends downwards to a suitable height above bottom floor 503 of litter tray 502. First movable section 518 also has an upwardly extending rear portion 522 which can be seen in FIG. 21. Second movable section 519 has a downwardly extending front portion 523 for catching upwardly extending rear portion 522 of first movable section 518 as the latter moves laterally towards the front of housing 101.

First movable section 518 of retractable cover 517 also has two attachments 524 and 525 positioned at opposite ends for pushing second movable section 519 towards the rear end of housing 501 after the completion of a waste-removing operation. Each of the attachments 524, 525 may comprise a cleaning pad for automatically cleaning or wiping transmitters 511, 512 and receivers 513, 514 as first movable section 518 is moved laterally in either direction. The cleaning pads may be made of any suitable material such as sponge, fabric or a rubber-like material. A liquid container (not shown) may be installed to provide a cleaning liquid to the cleaning pads for more effective cleaning of transmitters 511, 512 and receivers 513, 514.

It is now obvious that similar cleaning pads may be attached to the mechanism for moving scoop 509 for automatically cleaning or wiping the infrared transmitters and receivers in a similar fashion. For example, if these transmitters and receivers are positioned closer to openings 542 and 543, cleaning pads may be attached to the two sleeves which support the scoop's pivot rod (not shown) by means of L-shape extensions which extend through openings 542 and 543.

First movable section 512 has pins 526, 527 attached to one end and pins 528, 529 attached to the other end. Similarly second movable section 513 has pins 530, 531 attached to one end and pins 532, 533 attached to the other end.

Inner side wall 534 of housing 501 (shown in FIG. 20) contains slots 535 and 536 whereas inner side wall 537 (shown in FIG. 21) contains slots 538 and 539. Pins 526 and 527 are movable along slot 536 whereas pins 528 and 529 are movable along slot 539. Similarly pins 530 and 531 are movable along slot 535 whereas pins 532 and 533 are movable along slot 538. Slots 536 and 539 have upwardly sloping front ends 540, 541 in the respective order. Inner side walls 534 and 537 also have openings 542 and 543 in the respective order to accommodate the pivot rod (not shown) which connects scoop 509 to its drive mechanism.

A cover position sensor 544, which operates by means of a push rod 545, is provided for sensing the position of first movable section 518 of retractable cover 517 as it reaches the front end of housing 501.

The drive mechanism for moving first and second movable sections 518 and 519 includes a reversible electric motor 546 which is controlled by controller 510. A pulley 547 is connected to electric motor 546 for rotating an endless belt 548 in either direction. Belt 548 in turn rotates a second pulley 549 which is connected to a third pulley 550. Third pulley 550 moves a string 551 which is supported at the front end of housing 501 by a fourth pulley 552. A clip 553 is attached to string 551 and pin 526 on first movable section 518 of retractable cover 517.

Figure 20:
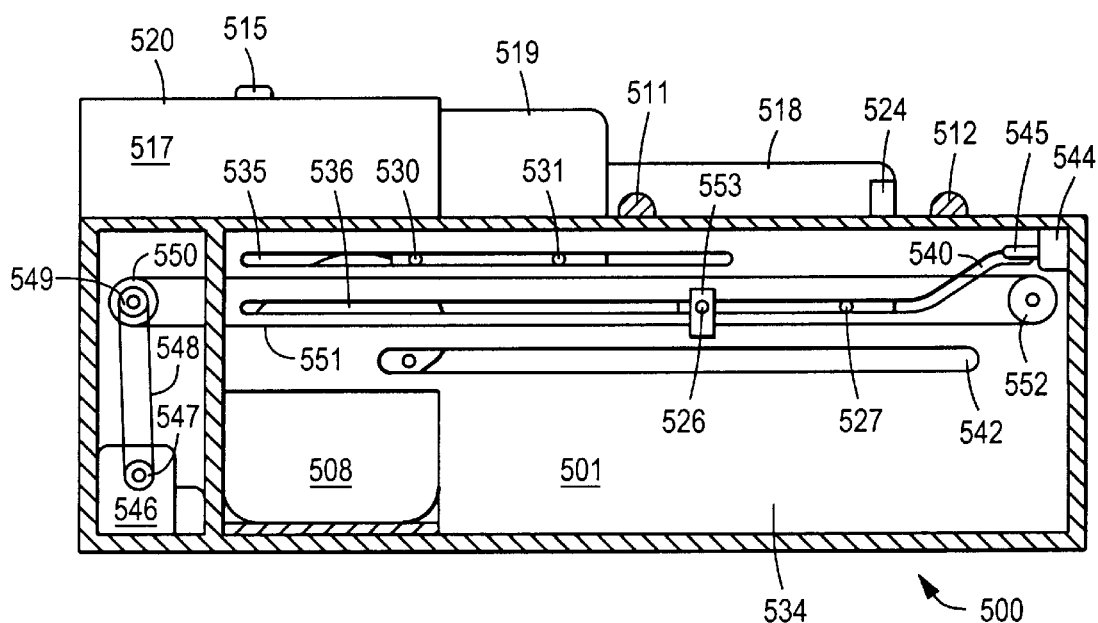
FIG. 20 is a sectional side view of the fourth embodiment taken along line 20–20' of FIG. 19 showing the drive mechanism for moving the retractable cover.
Figure 22A:
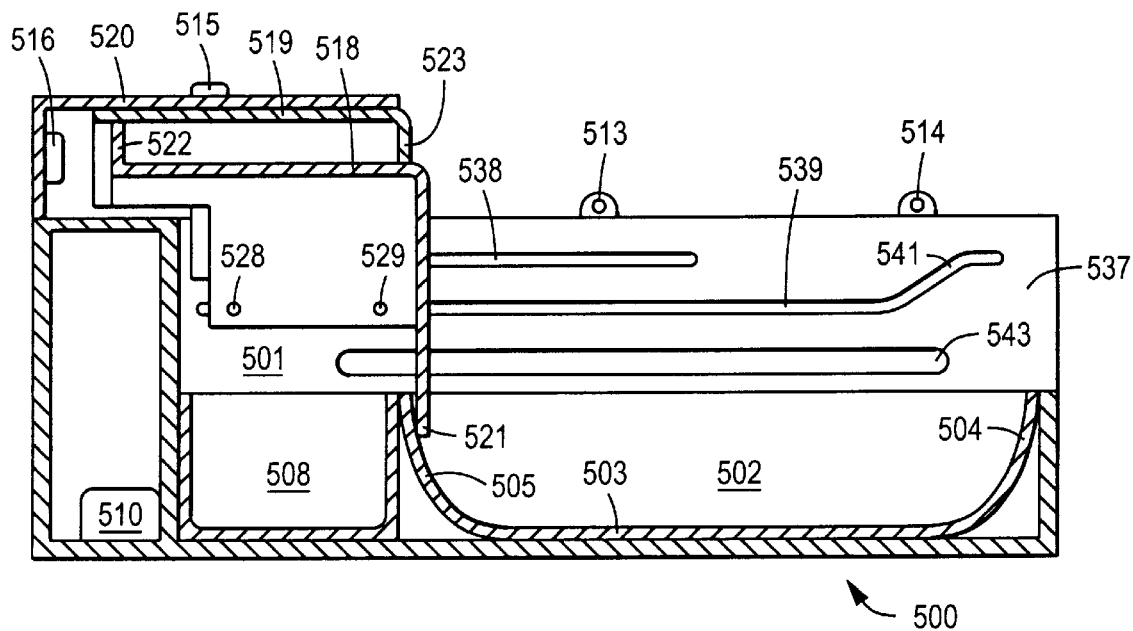
FIGS. 22A–22B are sectional side views of the fourth embodiment showing two end positions of the retractable cover.
Figure 22B:
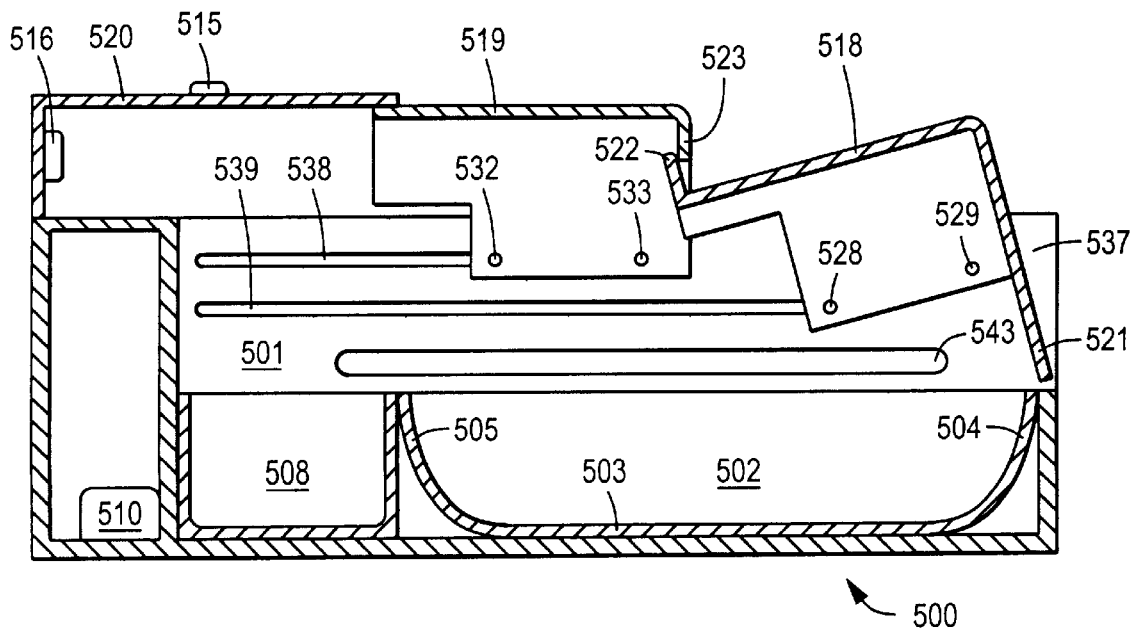

It can be seen that the rotation of pulley 547 by motor 546 in the counterclockwise direction with respect to FIG. 20 will move clip 553 towards the front end of housing 501 and cause first and second movable sections 518 and 519 of retractable cover 517 to move from the fully retracted position shown in FIG. 22A to the fully extended position shown in FIG. 22B. Conversely the rotation of pulley 547 by motor 546 in the clockwise direction with respect to FIG. 20 will move clip 553 towards the rear end of housing 501 and cause first and second movable section 518 and 519 of retractable cover 517 to move from their fully extended positions shown in FIG. 22B to their fully retracted position shown in FIG. 22A.

The function of upwardly sloping front ends 540, 541 is to cause front panel 521 of first movable section 518 to move upwards as it approaches front curved end 504 of litter tray 502. It can be easily seen that as pins 527 and 529 moves up along sloping front ends 540 and 541 of slots 536 and 539, panel 521 will move upwards in to the position shown in FIG. 22B. This makes it possible for a large amount of particulate litter to be placed in litter tray 502 without obstructing the movements of front panel 521. If a pile of litter is created by an animal inside litter tray 502, some of the litter may get pushed by front panel 521 towards front curved end 504 of litter tray 502 but this excess litter will be carried back towards the middle or the rear section of litter tray 502 during the waste-removing operation. An adjustable panel similar to the one used in the third embodiment may also be attached to panel 521.

It is also easily seen that the function of retractable cover 517 in making the waste-removing mechanism inaccessible to the animal during its fully automatic operation is similar to the function of retractable partition 322 of the third embodiment.

Description of the Fifth Embodiment

Figure 23:
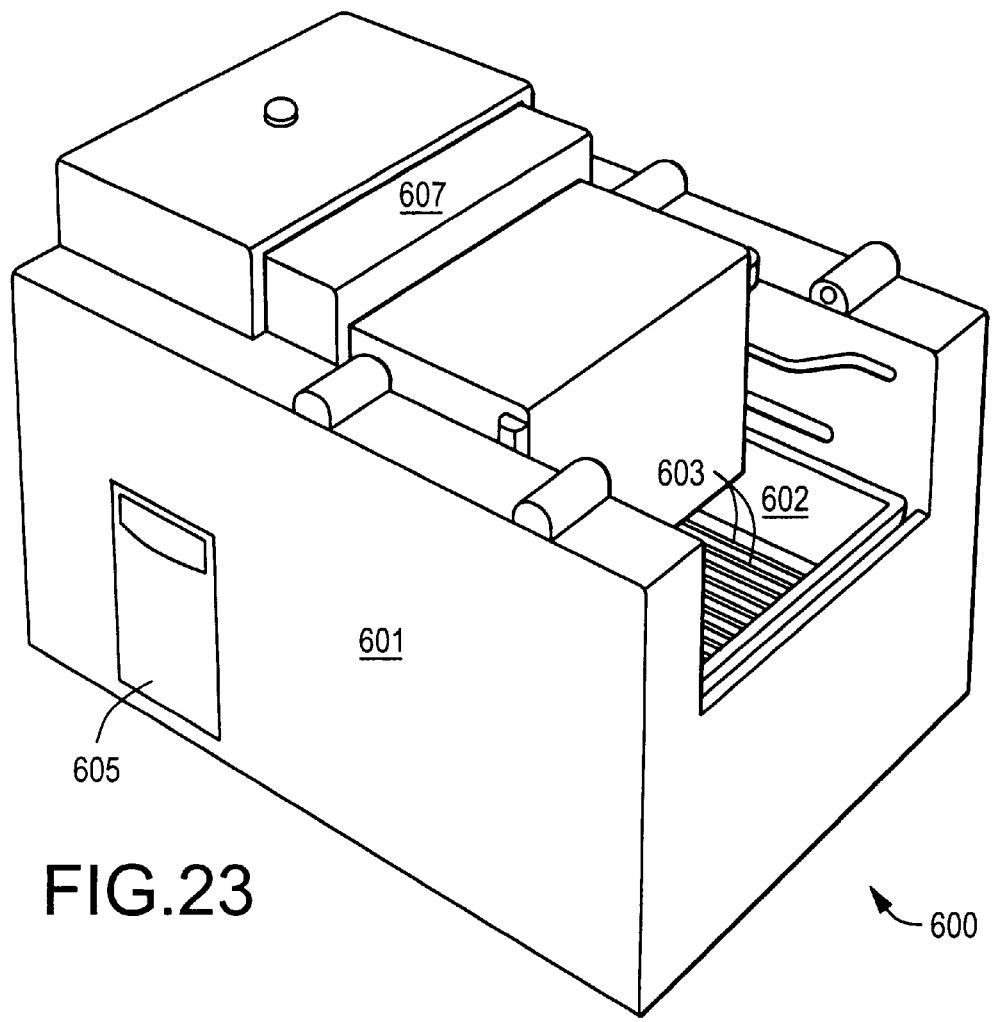
FIG. 23 is a perspective view of the fifth embodiment of the present invention for use with non-absorbent litter.
Figure 24:
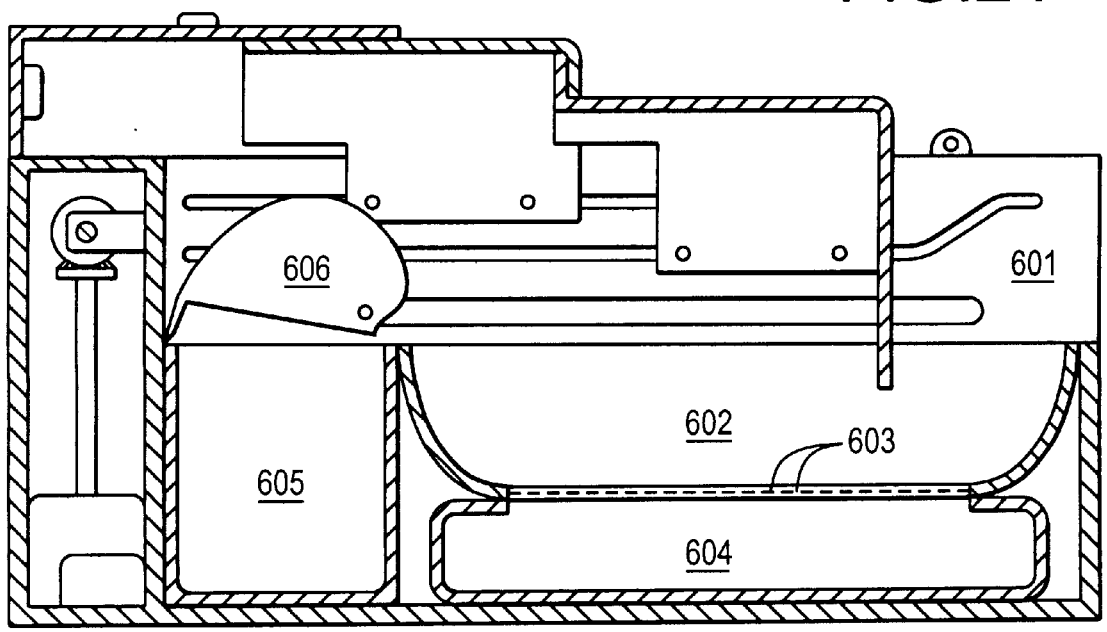
FIG. 24 is a sectional side view of the fifth embodiment of the present invention.

FIGS. 23 and 24 show another animal waste disposal system 600 for use with non-absorbent, non-clumpable litter. The housing 601 in this embodiment is taller than the housing of the fourth embodiment. Litter tray 602 has a plurality of perforations 603 at the bottom for draining liquid waste into a liquid-waste container 604. The width of perforations 603 should be small enough to prevent the particulate litter (not shown) from falling into liquid-waste container 604. A solid-waste container 605 is positioned adjacent to litter tray 602. A scoop 606 is shown in FIG. 24 in its inverted storage position above solid-waste container 605. A retractable cover 607 similar to the one described for the fourth embodiment is also provided.

An absorbent material such as a newspaper or a paper towel, or a solution of water and a deodorizing agent may be placed in liquid-waste container 604 for absorbing the liquid waste.

Non-absorbent, non-clumpable litter for use with this type of system may be made of a non-absorbent material such as rocks or plastic or it may be made of an absorbent material such as wood, paper product or ground clay coated with a water-repellent material. This type of litter creates less waste than clumpable litter and does not adhere to the litter tray or the scoop as much as clumpable litter does. It can also be washed and reused many times and may therefore be less expensive to use in the long run.

In order to reduce the total length of the housing in any of the embodiments described above, the waste container may be placed under the rear end of the litter tray and a chute may be provided for guiding animal's waste from the area behind the litter tray down to the waste container. In this case the electric motor which operates the scoop may be placed under the front end of the litter tray or under the chute at the rear end of the housing. A retractable ramp may be attached to the front of the housing for use by the animal in accessing the litter tray.

What is claimed is:

1. An animal waste disposal system comprising:
    a housing having an area for holding a bed of particulate litter;

a scooping device disposed within said housing for removing animal waste from said bed of particulate litter;

a drive mechanism for moving said scooping device along a predetermined path to position said scooping device over said bed of particulate litter, to lower said scooping device into said bed of particulate litter, and to raise said scooping device to remove animal waste from a section of said bed of particulate litter; and a controller for controlling said drive mechanism, wherein said controller is programmed to automatically choose a selected one of a plurality of predetermined paths to cause said scooping device to remove animal waste from a selected one of different sections along the length of said bed of particulate litter.

2. The animal waste disposal system of claim 1 wherein said drive mechanism comprises an electric motor.

3. The animal waste disposal system of claim 2, wherein said drive mechanism further comprises:

a first drive train, adapted to be coupled to said electric motor, for providing a lateral movement of said scooping device with respect to said housing; and a second drive train, adapted to be coupled to said electric motor, for providing a pivotal movement of said scooping device with respect to said housing.

4. The animal waste disposal system of claim 3, further including an electro mechanical device coupled to said electric motor for selectively engaging either said first drive train or said second drive train with said electric motor.

5. The animal waste disposal system of claim 3 wherein said first drive train comprises a threaded rod coupled to said electric motor and a sleeve coupled to said threaded rod, wherein said sleeve is moved laterally by the rotation of said threaded rod in either direction.

6. The animal waste disposal system of claim 2, wherein said drive mechanism comprises:

a lateral drive mechanism for moving said scooping device laterally over said bed of particulate litter; and a panel mounted to said housing, wherein said panel comprises a plurality of guide rails for engaging with said scooping device to cause said scooping device to pivot into and out of said bed of particulate litter as one end of said scooping device is moved laterally by said lateral drive mechanism.

7. The animal waste disposal system of claim 6 wherein said plurality of guide rails are positioned in a substantially enclosed compartment adjacent to said area for holding a bed of particulate litter.

8. The animal waste disposal system of claim 6, wherein said controller varies the location where said scooping device is pivoted into said bed of particulate litter by varying the distance said one of said scooping device is moved laterally in one direction before said scooping device is moved in the opposite direction.

9. The animal waste disposal system of claim 1, wherein a cross-section of said scooping device has a substantially concave shape.

10. The animal waste disposal system of claim 6, wherein said plurality of rails is formed by protrusions formed in said panel.

11. An animal waste disposal system comprising:

a housing having an area for holding a bed of particulate litter;

a scoop disposed with said housing for removing animal's waste from said bed of particulate litter;

a lateral drive mechanism coupled to said scoop for moving said scoop in opposite directions along a horizontal path above said area for holding a bed of particulate litter;

a pivotal drive mechanism coupled to said scoop for pivoting said scoop by more than 270 degrees with respect to said housing; and a waste container disposed with said housing for receiving animal's waste collected by said scoop from said area for holding a bed of particulate litter.

12. The animal waste disposal system of claim 11 wherein said pivotal drive mechanism pivots said scoop by approximately 360 degrees with respect to said housing.

13. An animal waste disposal system comprising:

a housing having an area for holding a bed of particulate litter;

a scooping device having a plurality of openings for separating animal waste from said particulate litter;

a drive mechanism coupled to said scooping device for lowering and raising said scooping device, and for moving said scooping device laterally between a first position and a second position, wherein the distance from said first position to said second position is less than the entire length of said bed; and wherein said drive mechanism moves said scooping device in a first lateral direction from said first position to said second position after said scooping device has been lowered into said bed, and then moves said scooping device laterally from said second position to said first position after said scooping device has been substantially raised over said bed.

14. The animal waste disposal system of claim 13, wherein said drive mechanism is coupled to said scooping device such that said drive mechanism moves said scooping device in opposite directions along a horizontal path.

15. The animal waste disposal system of claim 13, further comprising a waste container disposed within said housing for receiving animal waste collected by said scooping device from said area for holding a bed of particulate litter.

16. An animal waste disposal system comprising:

a housing having an area for holding a bed of particulate litter;

a sifting device having a plurality of openings for separating animal waste from said particulate litter;

a drive mechanism for moving said sifting device over said area for holding said bed of particulate litter;

a mechanism for vibrating said sifting device over said area for holding said bed of particulate litter to better separate said animal waste from said particulate litter; and wherein said mechanism for vibrating said sifting device operates by dragging a member connected to said sifting device against a member connected to said housing as said sifting device is moved with respect to said housing by said drive mechanism.

17. The animal waste disposal system of claim 16 wherein at least one of said member connected to said sifting device and said member connected to said housing comprises an uneven surface for causing said member connected to said sifting device to vibrate as said sifting device is moved by said drive mechanism.

18. An animal waste disposal system comprising:

a housing having an area for holding a bed of particulate litter;

a waste-removing device movable over said area for holding a bed of particulate litter;

a drive mechanism for moving said waste-removing device to remove animal's waste from said bed of particulate litter;

a waste container positioned for receiving animal's waste removed from said bed of particulate litter by said waste-removing device;

a retractable partition disposed with said housing; and a drive mechanism for moving said retractable partition across said area for holding a bed of particulate litter between a retracted position and an extended position.

19. The animal waste disposal system of claim 18 wherein said retractable partition allows animal's access to said area for holding a bed of particulate litter when said retractable partition is in said retracted position and prevents animal's access to said area for holding a bed of particulate litter when said retractable partition is in said extended position.

20. The animal waste disposal of claim 19 wherein said retractable partition forms a part of a substantially enclosed compartment for containing animal's waste inside said waste container when said retractable partition is in said retracted position and wherein said retractable partition allows a transportation of animal's waste from said area for holding a bed of particulate litter to said waste container when said retractable partition is in said extended position.

21. The animal waste disposal system of claim 19 wherein said drive mechanism for moving said retractable partition automatically moves said retractable partition from said retracted position to said extended position prior to the removal of animal's waste from said bed of particulate litter and returns said retractable partition to said retracted position after the removal of animal's waste from said bed of particulate litter.

22. The animal waste disposal system of claim 21 wherein said retractable partition comprises a downwardly extending portion which is moved substantially across the length of said area for holding a bed of particulate litter by said drive mechanism for moving said retractable partition.

23. The animal waste disposal system of claim 22, further including a hood for covering said area for holding a bed of particulate litter and wherein said retractable partition is attached to the interior of said hood.

24. The animal waste disposal system of claim 22 wherein the gap between said downwardly extending portion and the floor of said area for holding a bed of particulate litter is adjustable by the user.

25. The animal waste disposal system of claim 22 further including a mechanism for automatically raising said downwardly extending portion as it approaches said extended position.

26. An animal waste disposal system comprising:

a housing having an area for holding a bed of particulate litter;

a waste-removing mechanism disposed within said housing for removing animal waste from said bed of particulate litter;

an animal sensing device positioned adjacent to said area for holding a bed of particulate litter; and a wiper, attached to and moved by said waste-removing mechanism, for automatically wiping and cleaning said animal sensing device.

27. The animal waste disposal system of claim 26, wherein said animal sensing device comprises a plurality of spaced-apart components positioned adjacent to said area for holding a bed of particulate litter and wherein said waste-removing mechanism for moving said wiper moves said wiper laterally past said plurality of spaced-apart components to wipe and clean said plurality of spaced-apart components.

28. The animal waste disposal system of claim 26, further including a retractable partition which is automatically moved across said area for holding a bed of particulate litter before and after the removal of animal's waste from said bed of particulate litter, wherein said wiper is attached to and moved by said retractable partition.

29. A method for removing animal waste from a bed of particulate litter comprising:

programming a controller to cause a waste-removing device to move along a selected one of different sections along the length of said bed of particulate litter.

30. The method of claim 29, wherein said programming step comprises programming a controller device comprising:

a housing having an area for holding a bed of particulate litter;

a scooping device disposed within said housing for removing animal waste from said bed of particulate litter;

a drive mechanism for moving said scooping device along a predetermined path to position said scooping device over said bed of particulate litter, to lower said scooping device into said bed of particulate litter, and to raise said scooping device to remove animal waste from a section of said bed of particulate litter; and a controller for controlling said drive mechanism, wherein said controller is programmed to automatically choose a selected one of a plurality of predetermined paths to cause said scooping device to remove animal waste from said selected one of different sections along the length of said bed of particulate litter.

* * * * *